June 5, 1934.  A. E. DRISSNER ET AL  1,961,605
STANDARD SPINDLE NOSE
Filed March 26, 1931  25 Sheets-Sheet 1
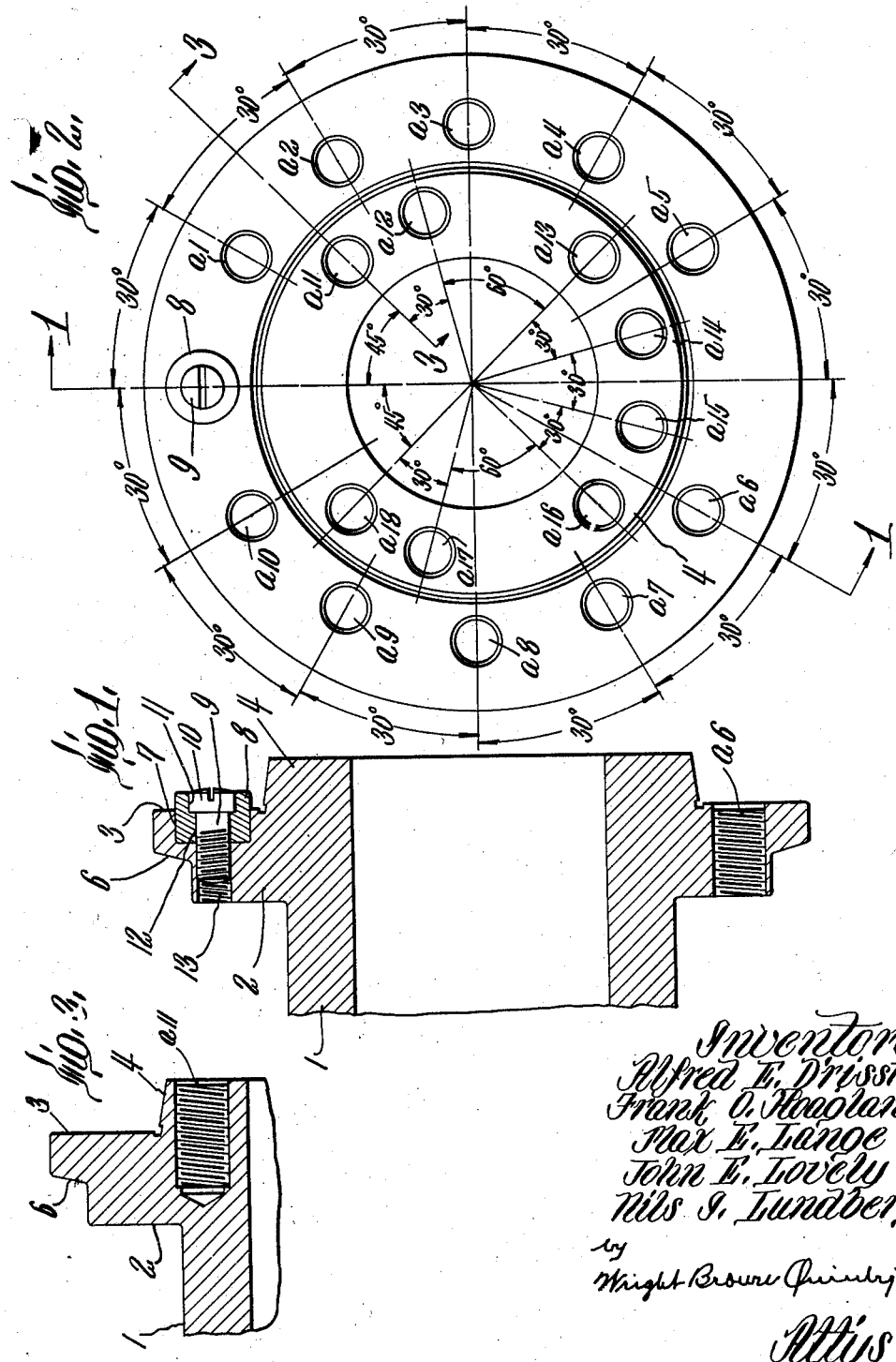

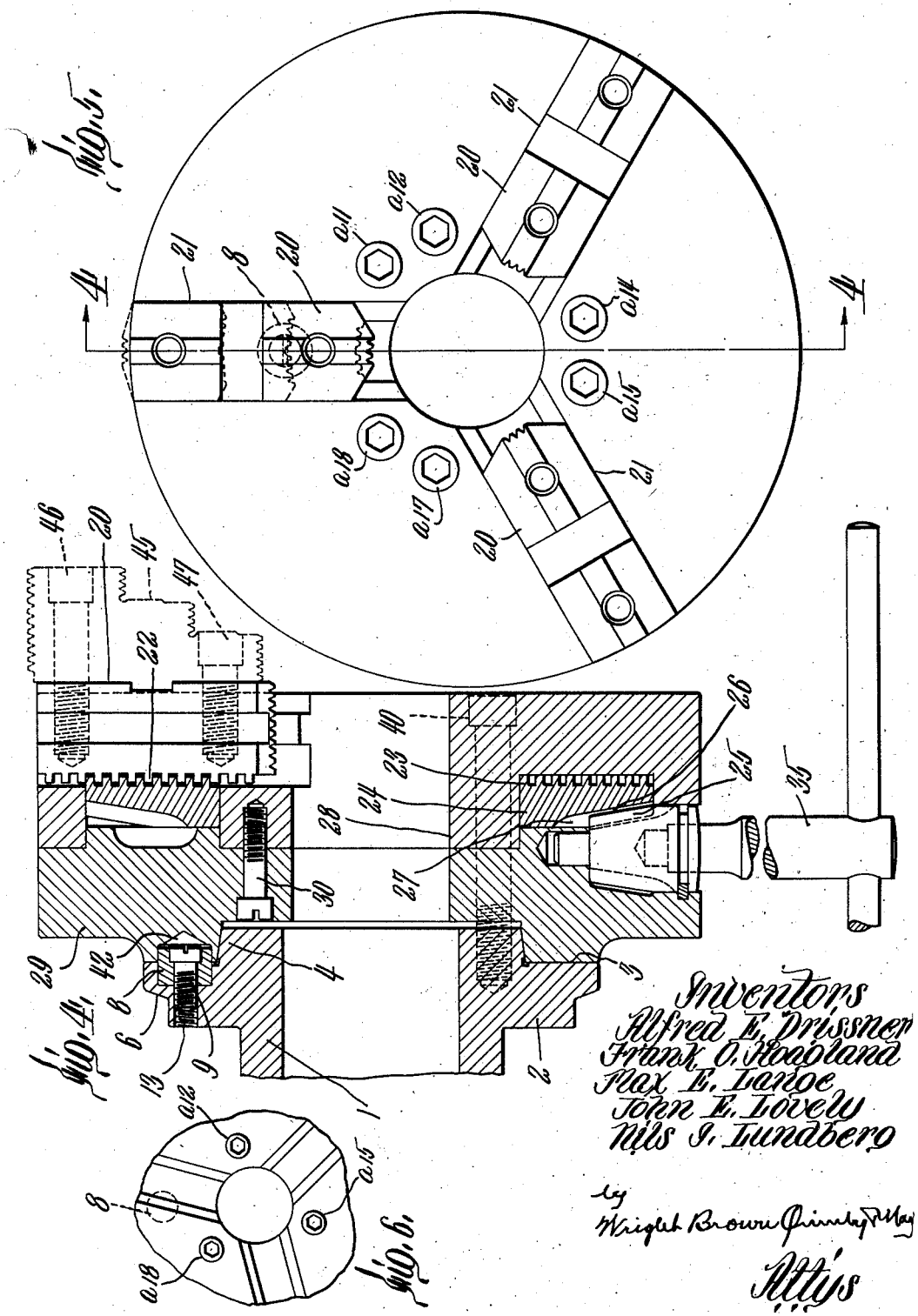

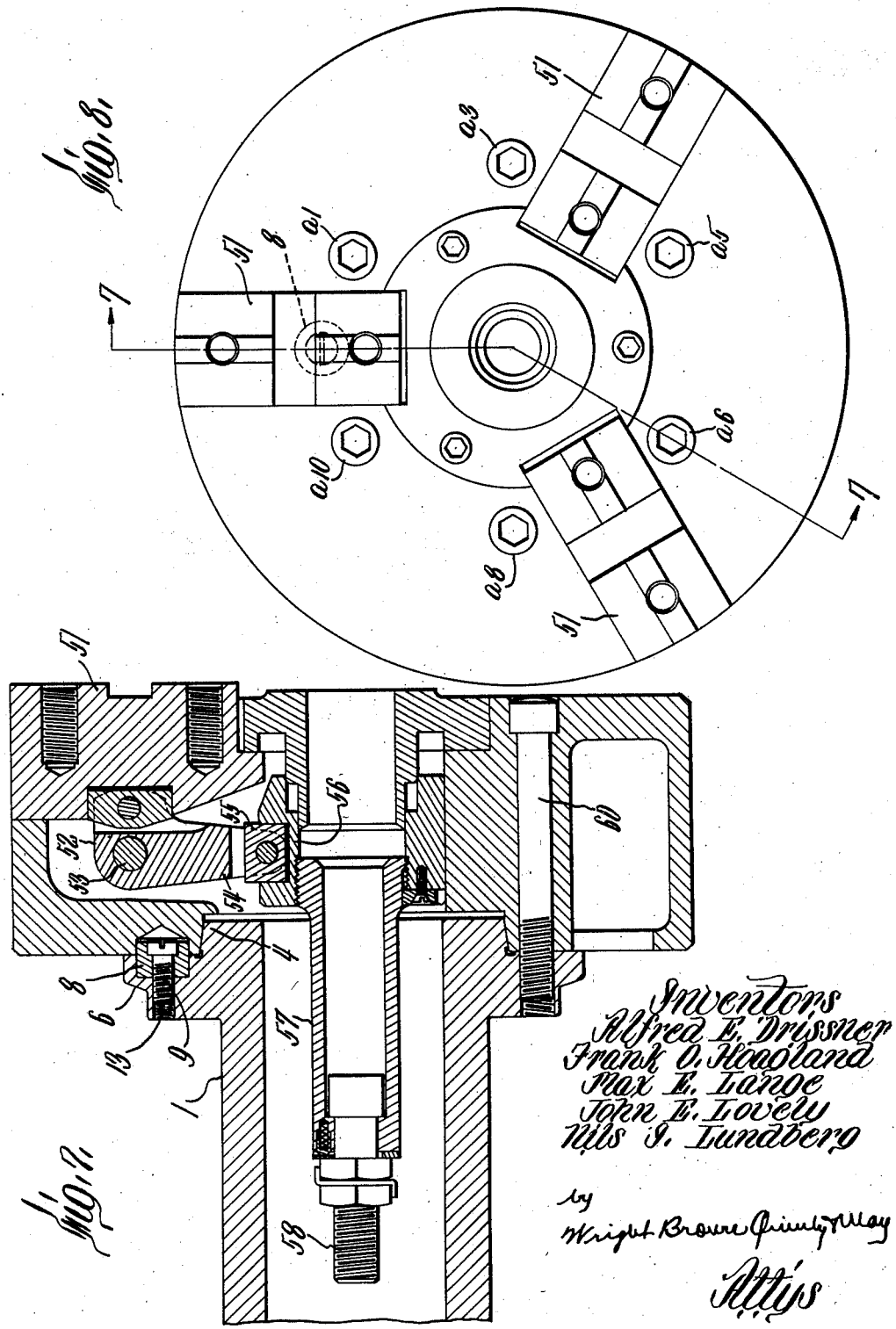

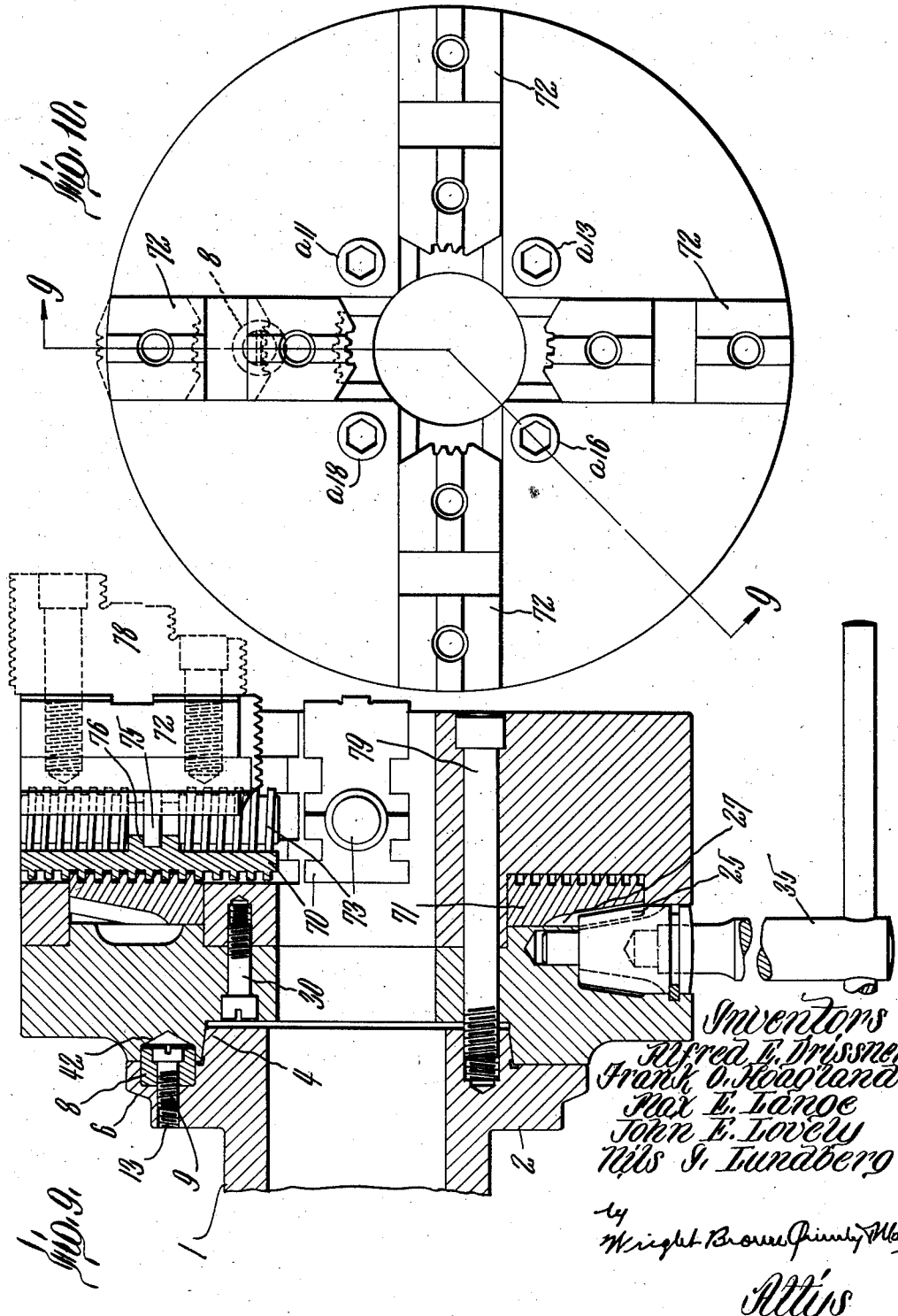

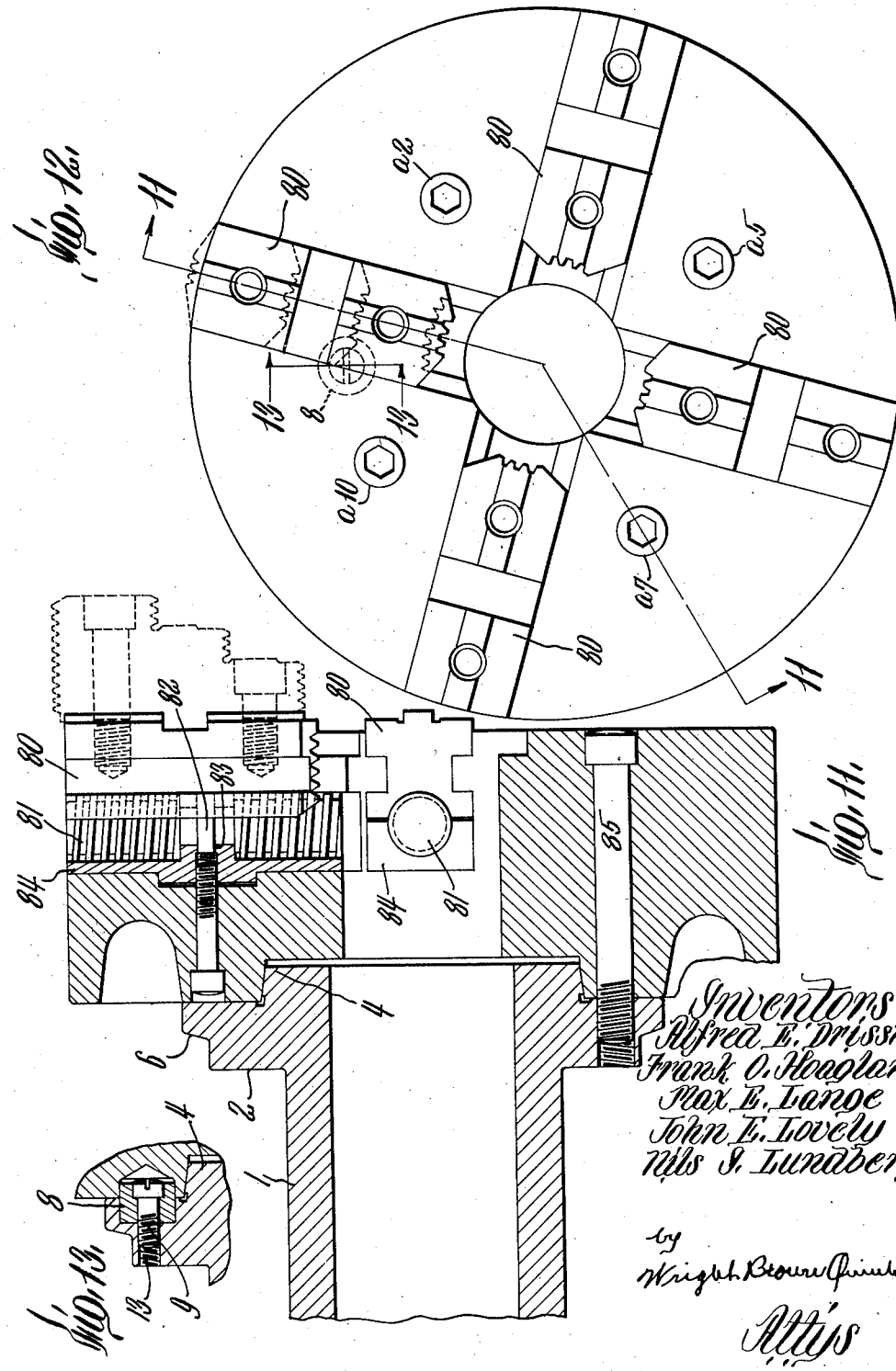

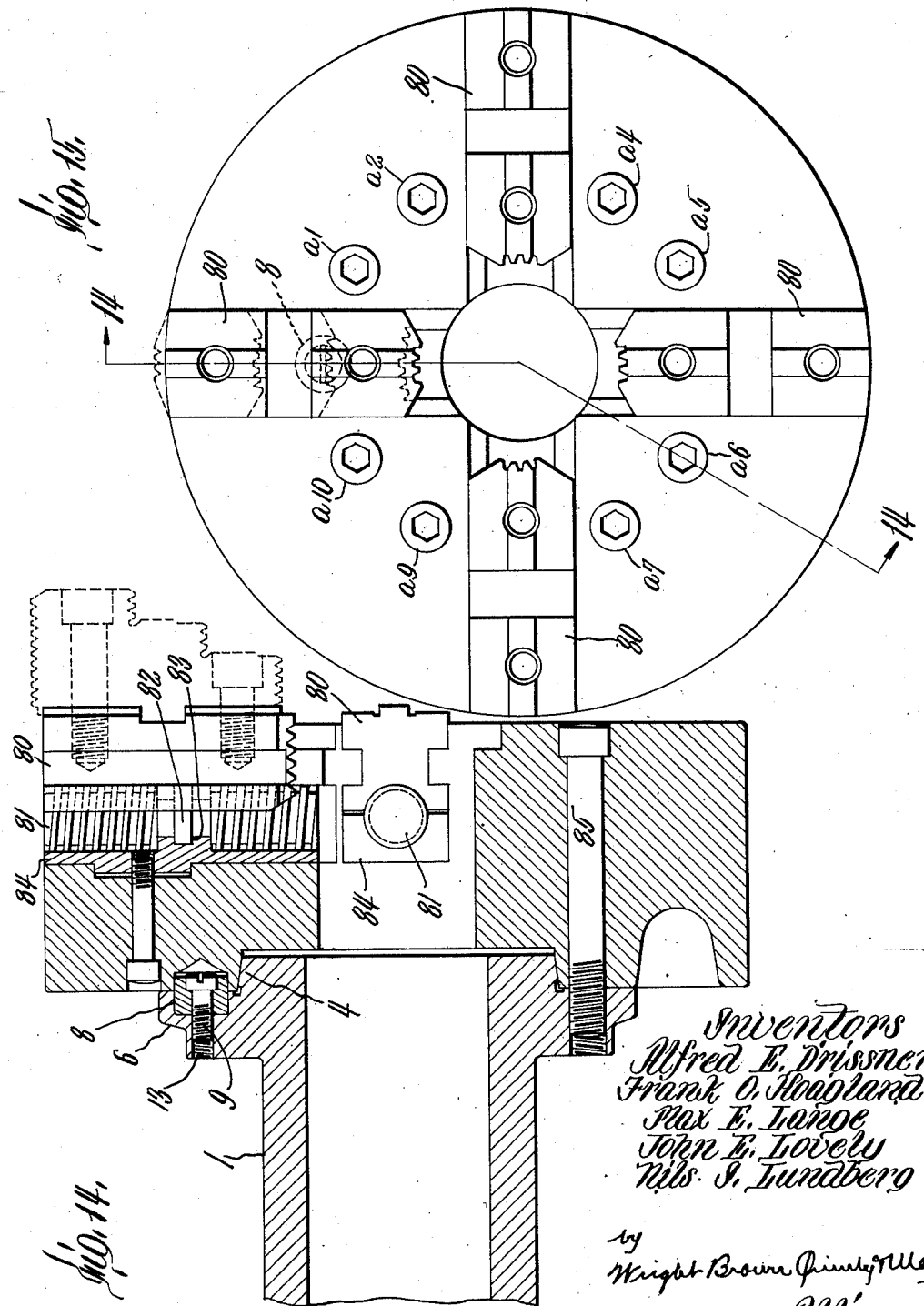

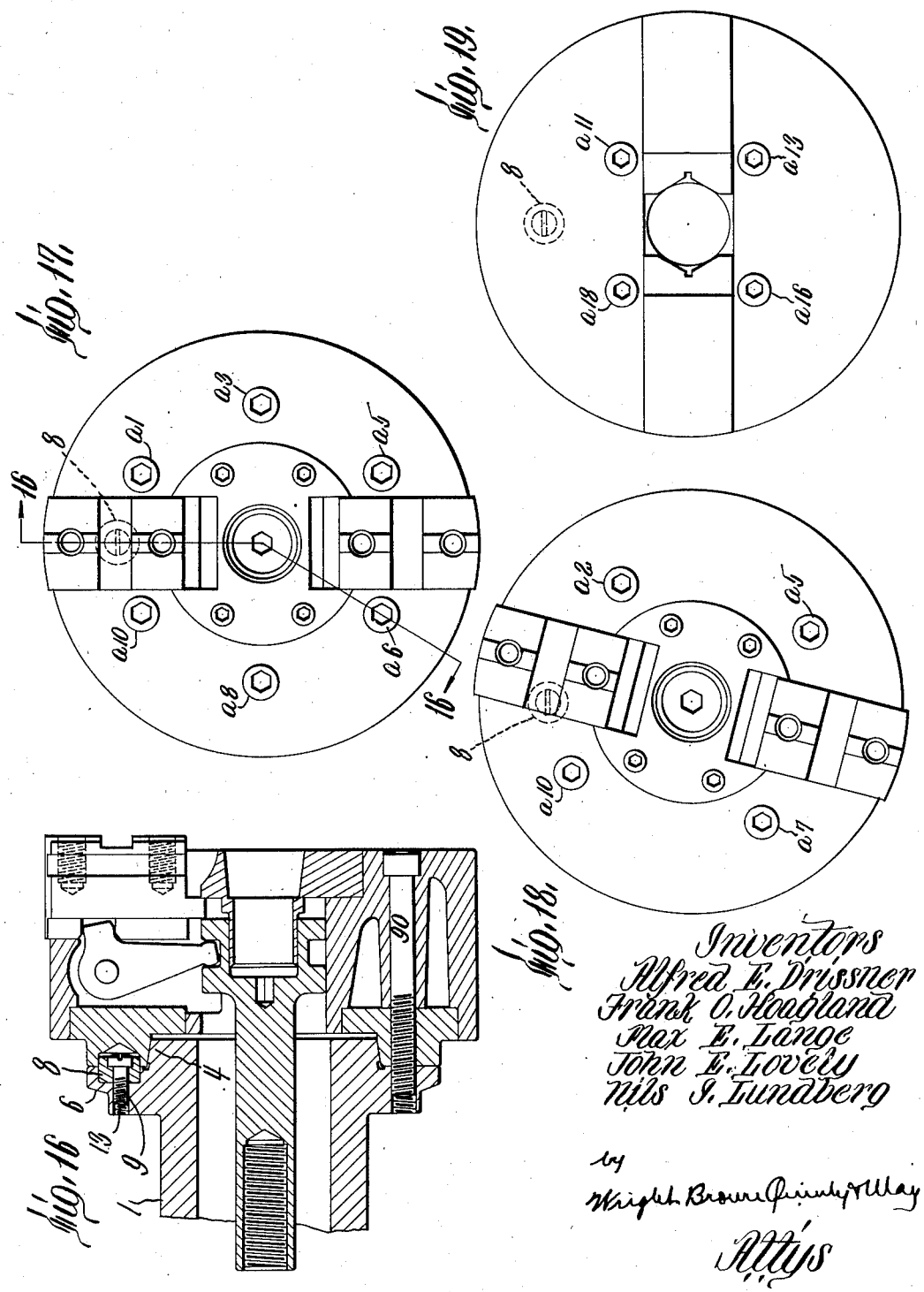

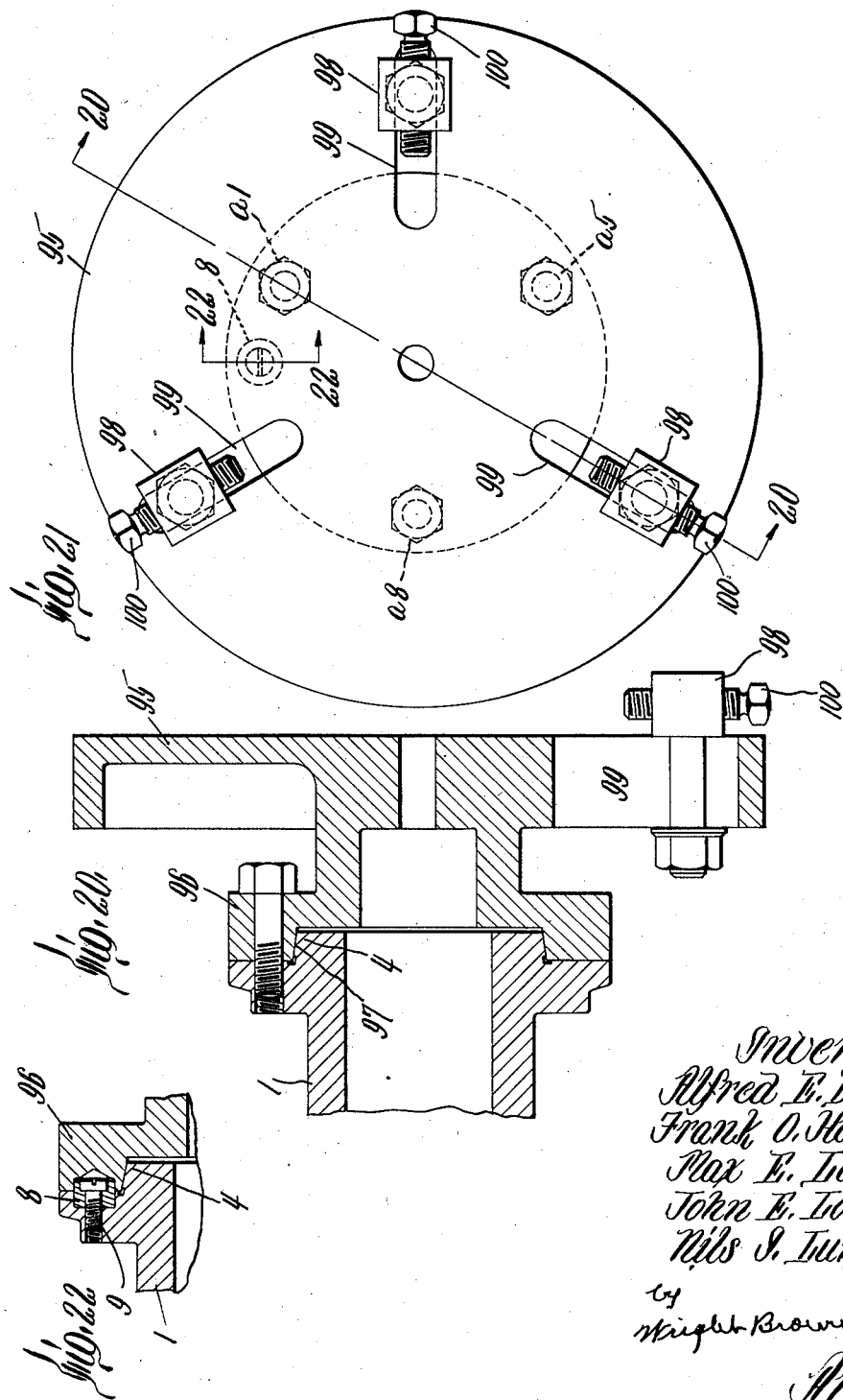

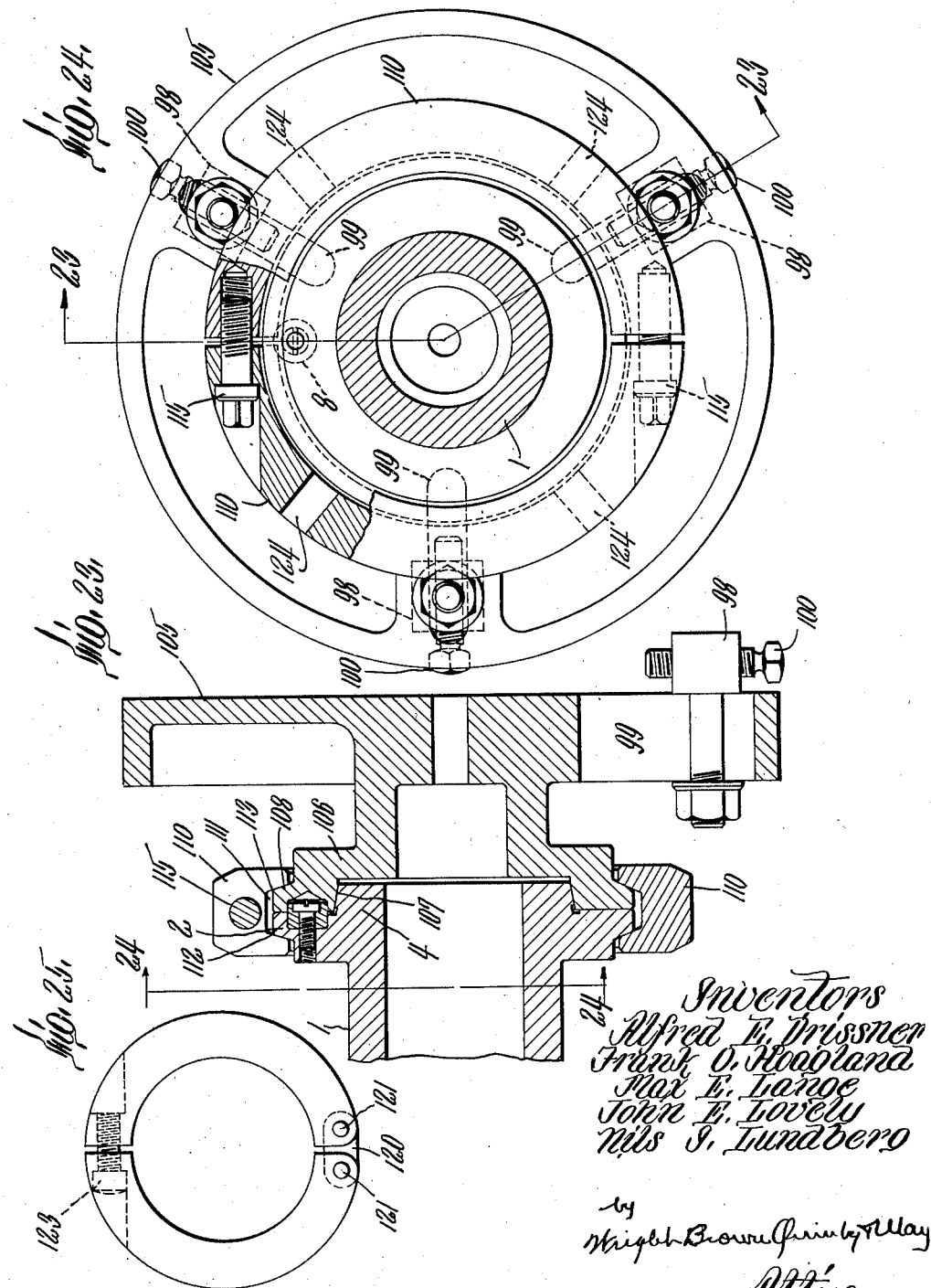

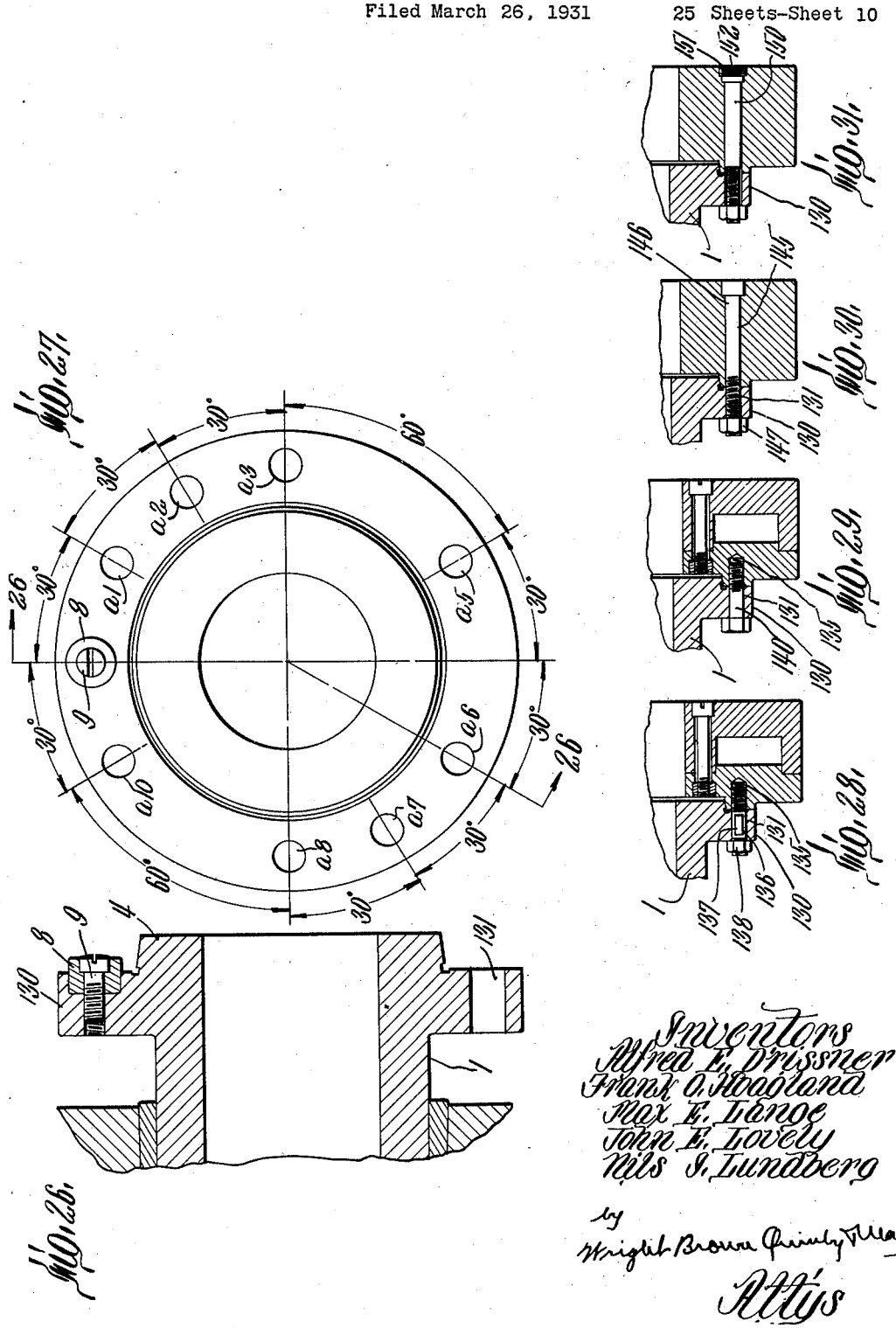

June 5, 1934.  A. E. DRISSNER ET AL  1,961,605
STANDARD SPINDLE NOSE
Filed March 26, 1931   25 Sheets-Sheet 11
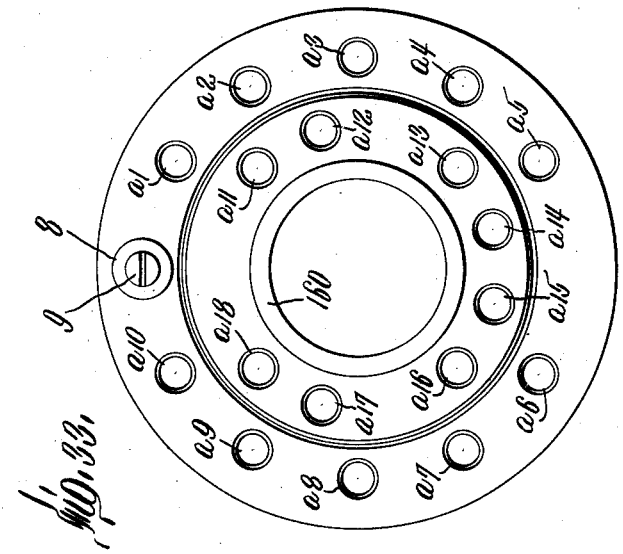
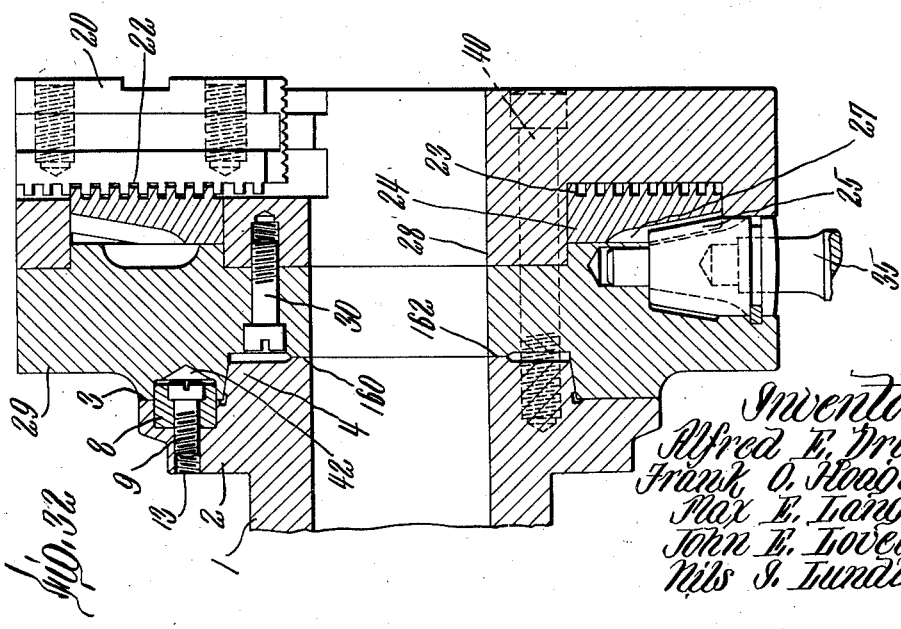

June 5, 1934.  A. E. DRISSNER ET AL  1,961,605
STANDARD SPINDLE NOSE
Filed March 26, 1931   25 Sheets-Sheet 12
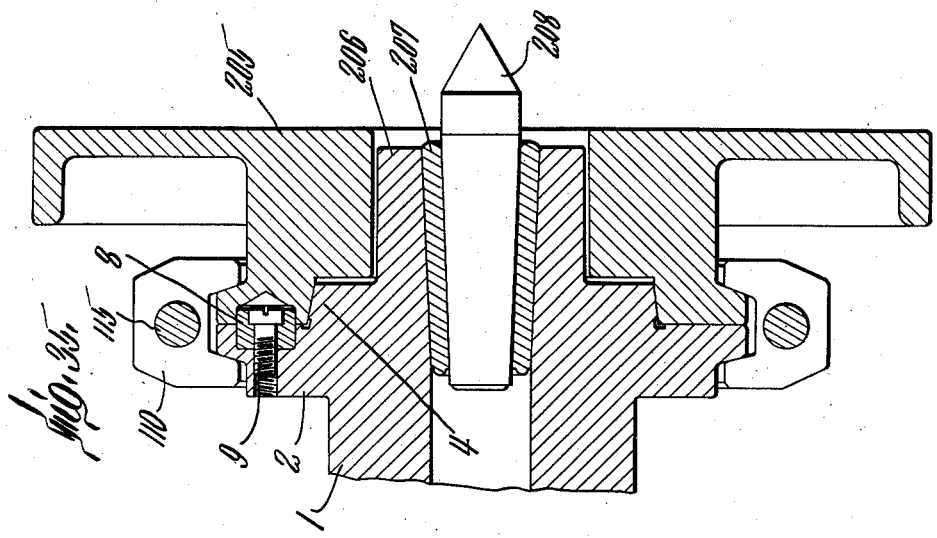
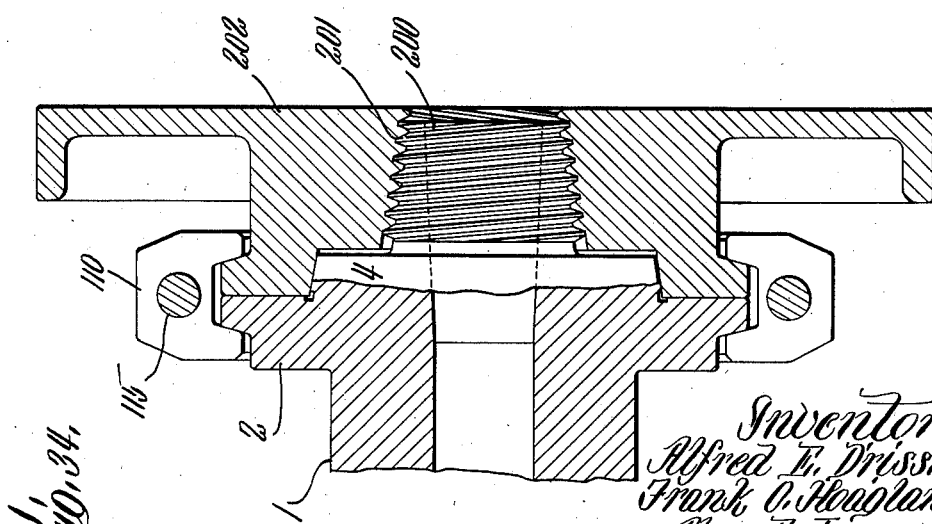

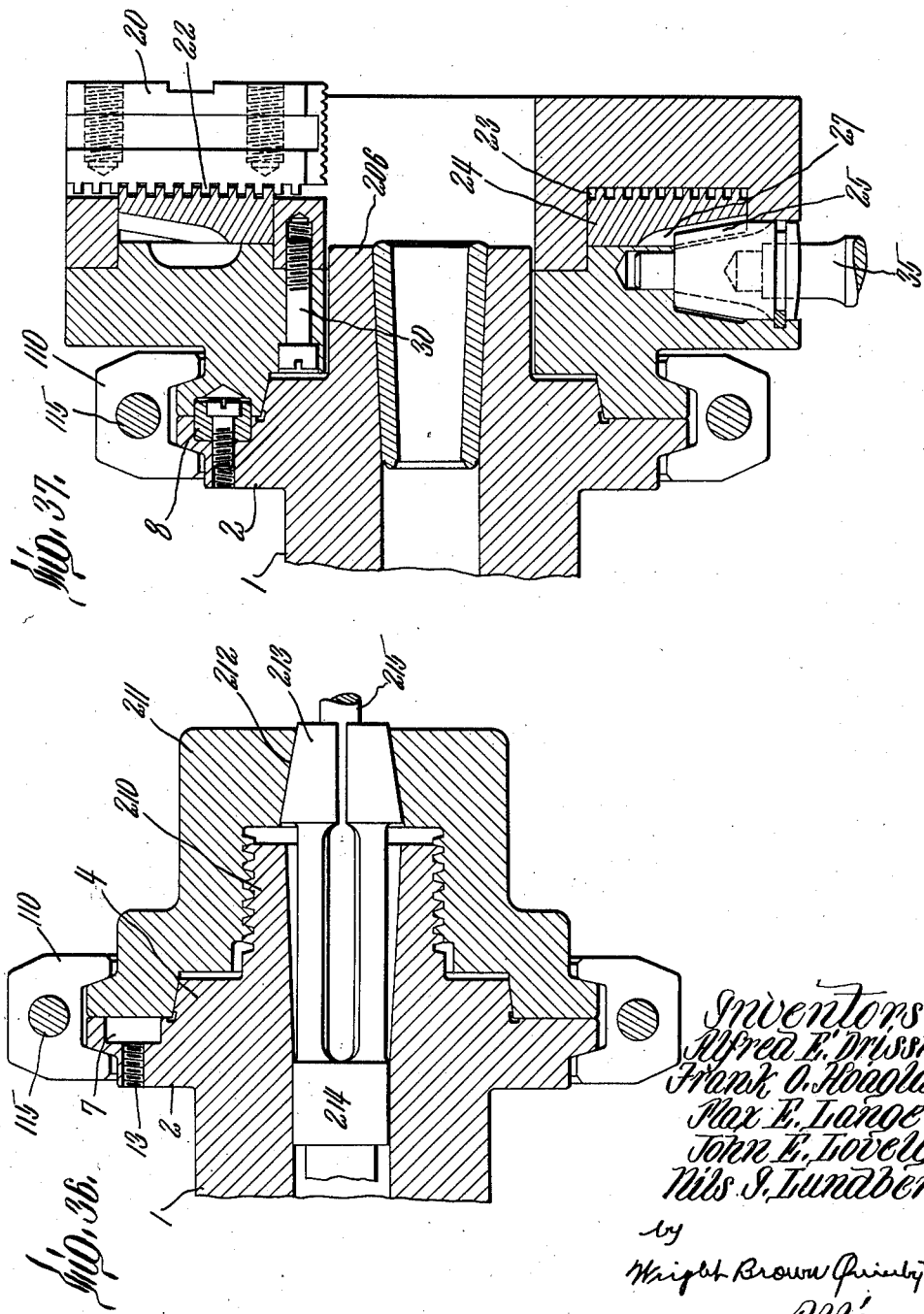

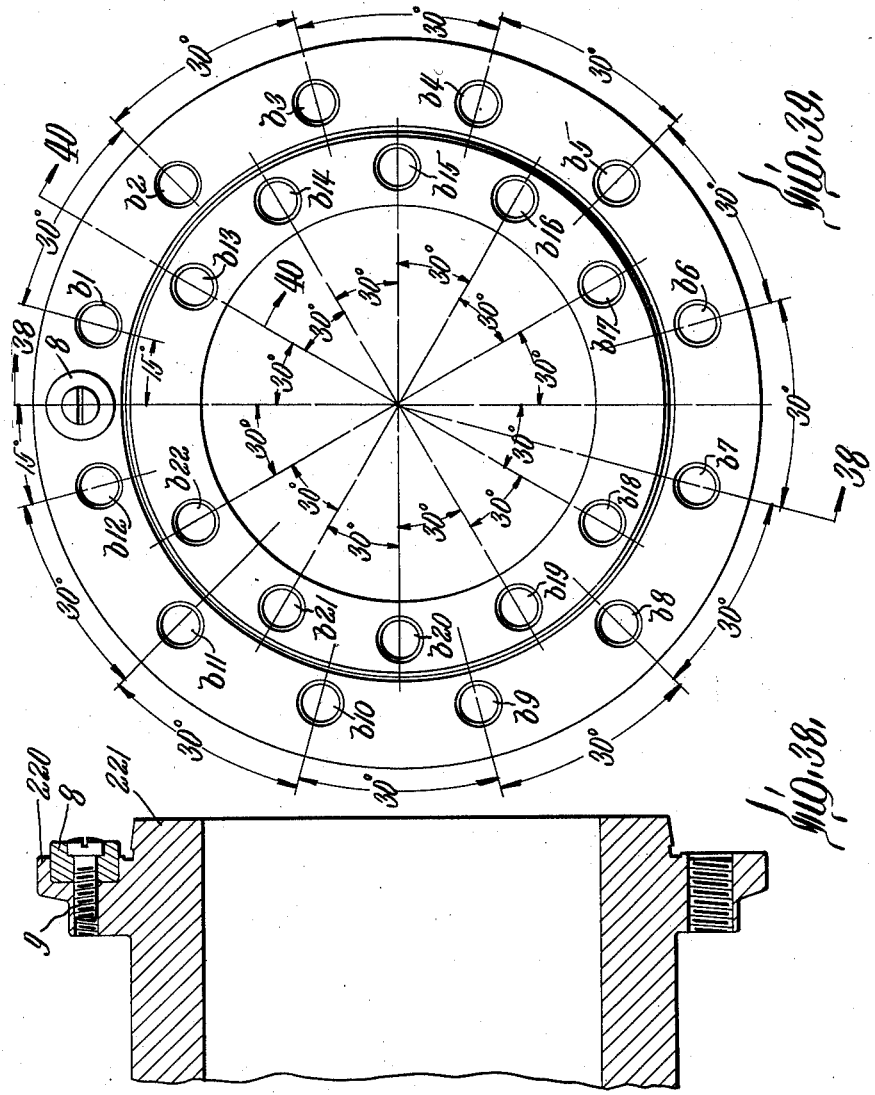
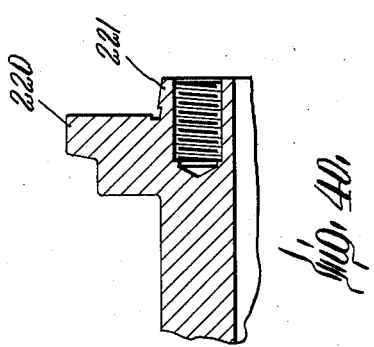

June 5, 1934.  A. E. DRISSNER ET AL  1,961,605
STANDARD SPINDLE NOSE
Filed March 26, 1931    25 Sheets-Sheet 16
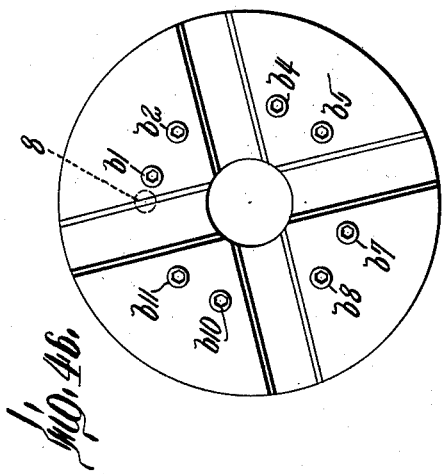
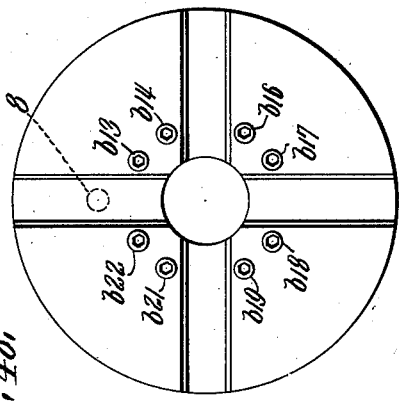
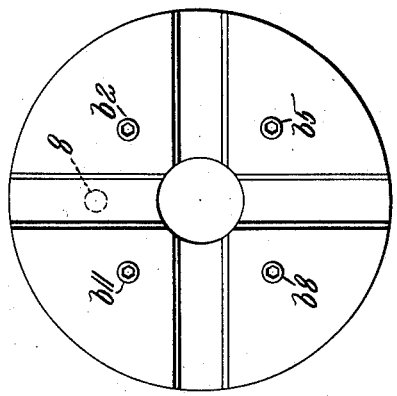
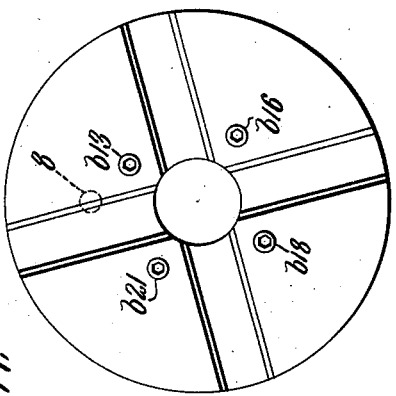

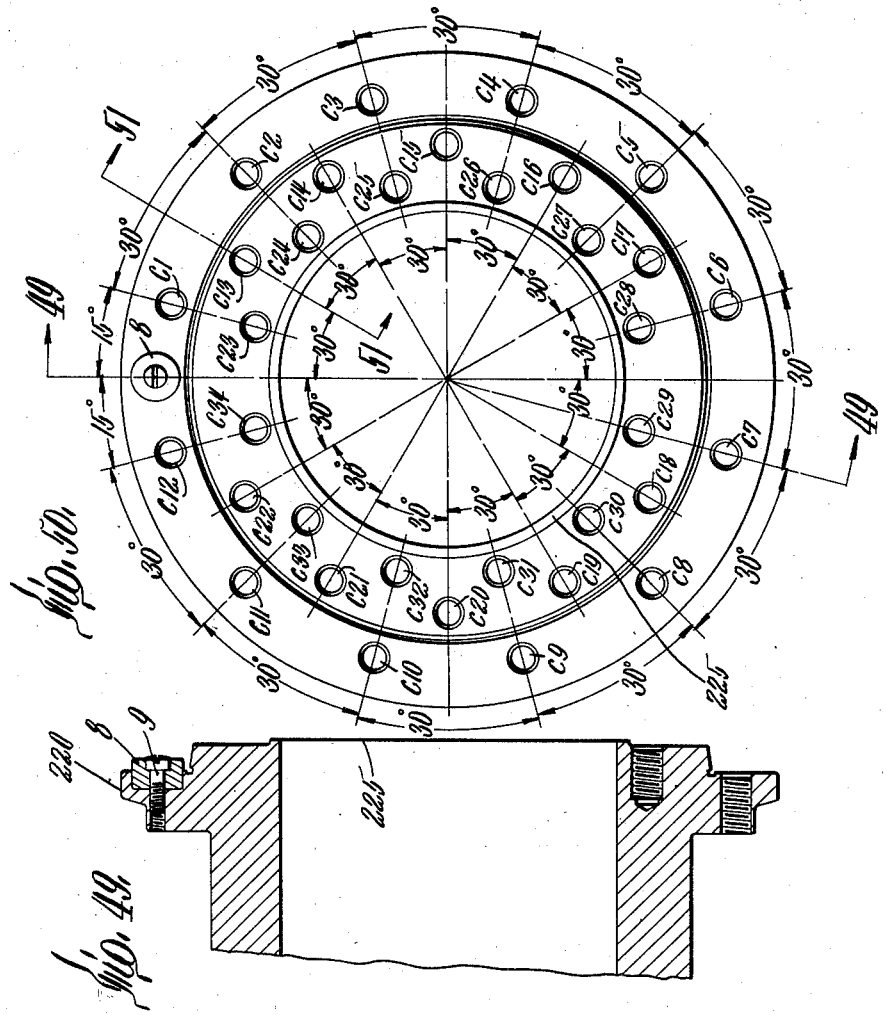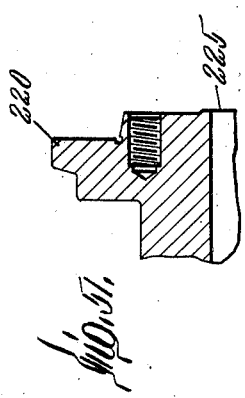

June 5, 1934.  A. E. DRISSNER ET AL  1,961,605
STANDARD SPINDLE NOSE
Filed March 26, 1931  25 Sheets-Sheet 18
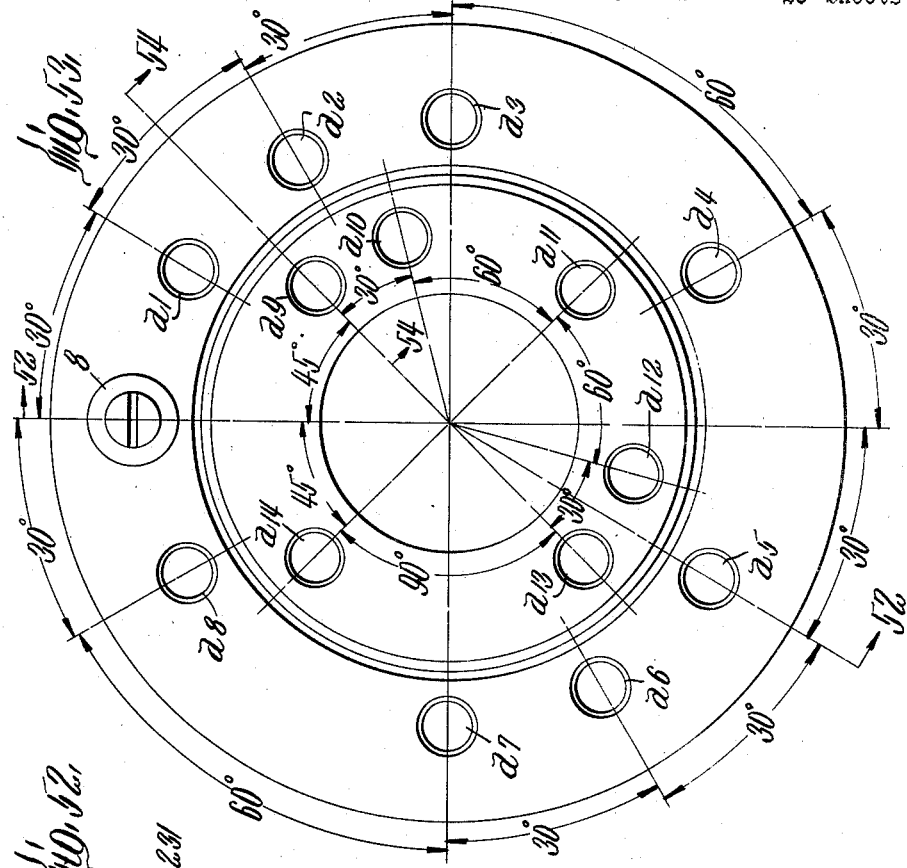
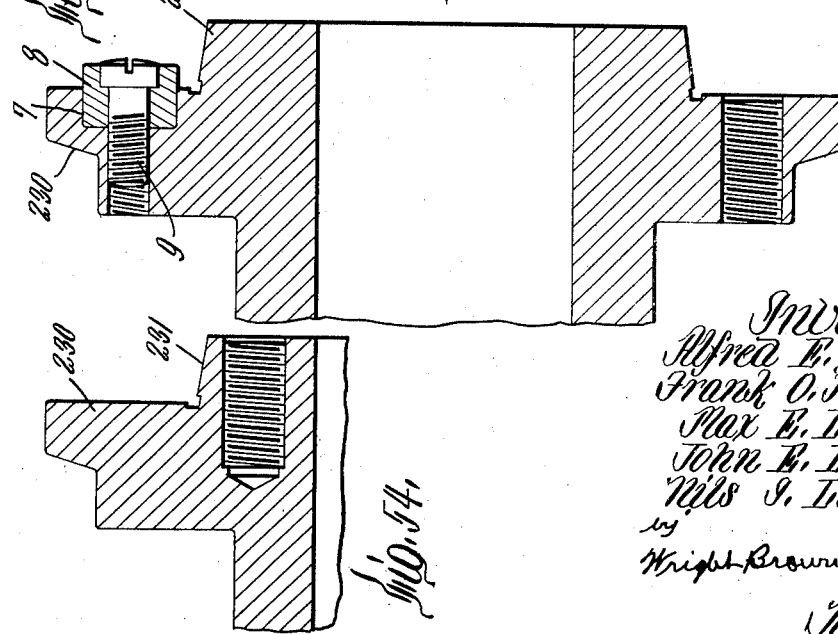

June 5, 1934.  A. E. DRISSNER ET AL  1,961,605
STANDARD SPINDLE NOSE
Filed March 26, 1931   25 Sheets-Sheet 19
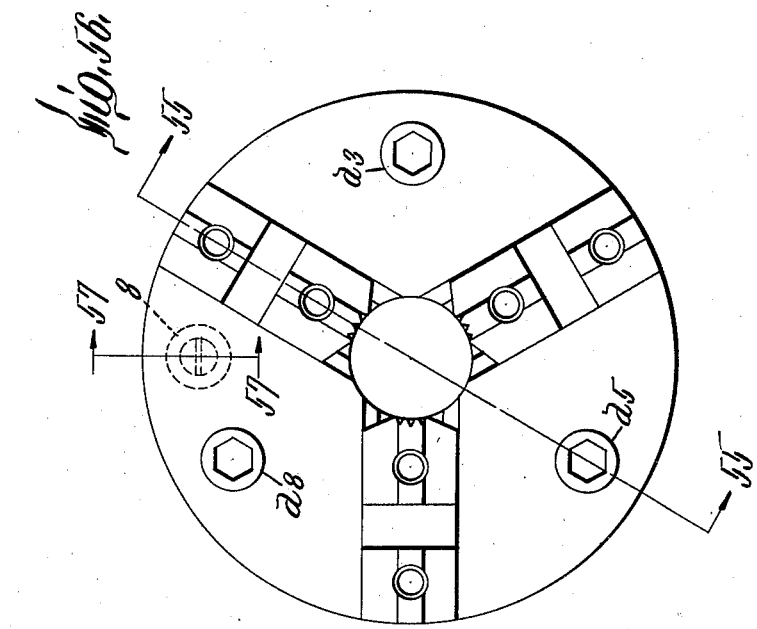
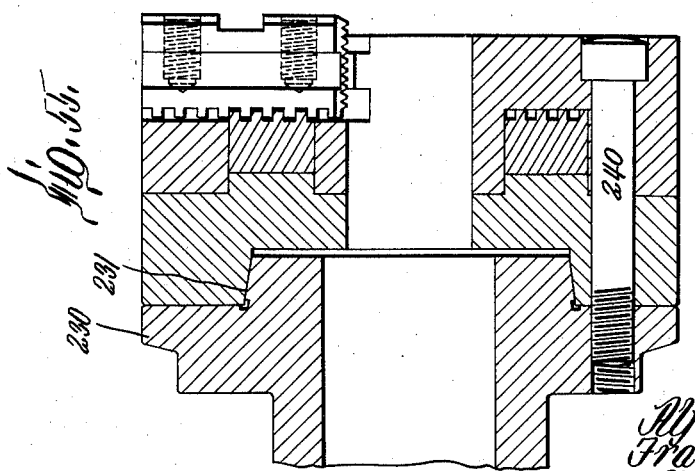
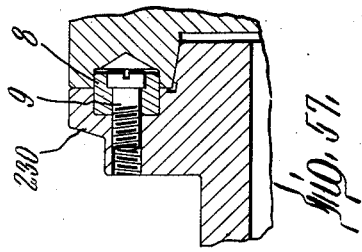
Inventors
Alfred E. Drissner
Frank O. Hoagland
Max E. Lange
John E. Lovely
Nils J. Lundberg
by
Wright Brown Quinby & May
Attys June 5, 1934.    A. E. DRISSNER ET AL    1,961,605
STANDARD SPINDLE NOSE
Filed March 26, 1931    25 Sheets-Sheet 20
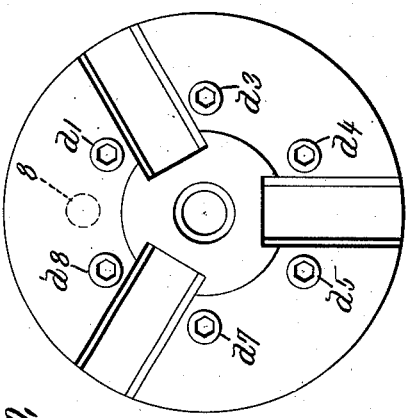
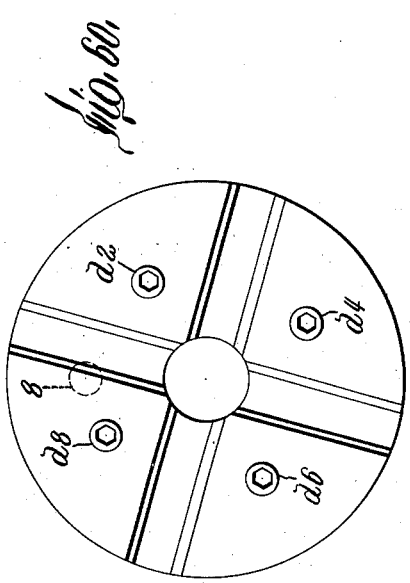
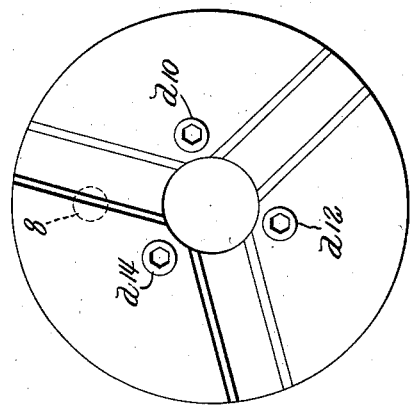

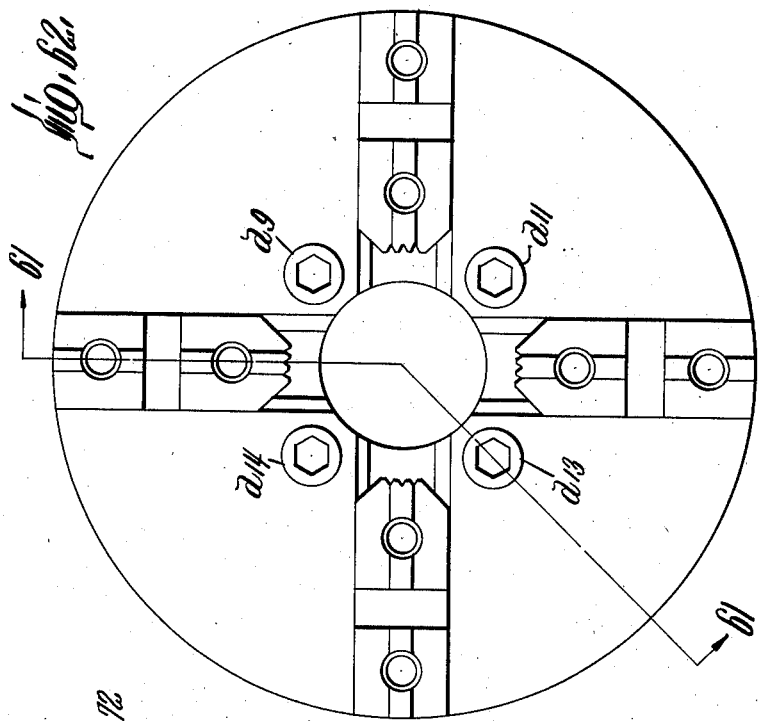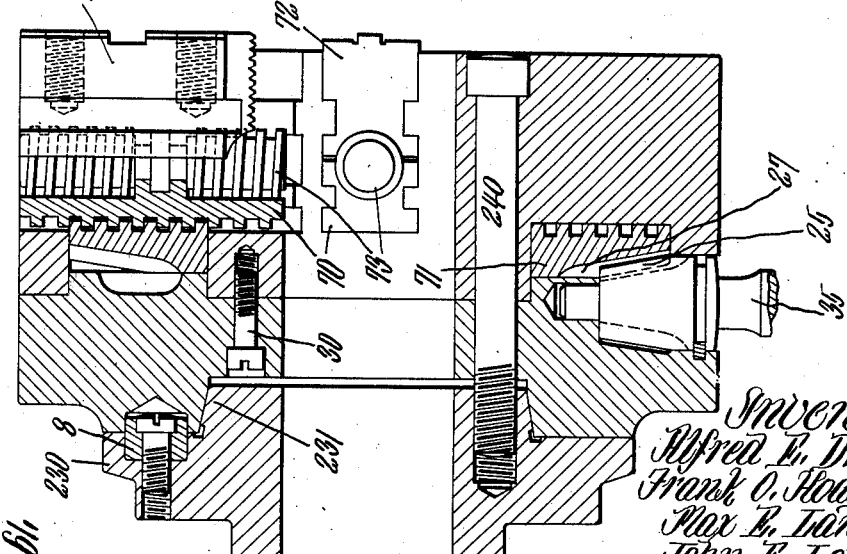

June 5, 1934.  A. E. DRISSNER ET AL  1,961,605
STANDARD SPINDLE NOSE
Filed March 26, 1931  25 Sheets-Sheet 22
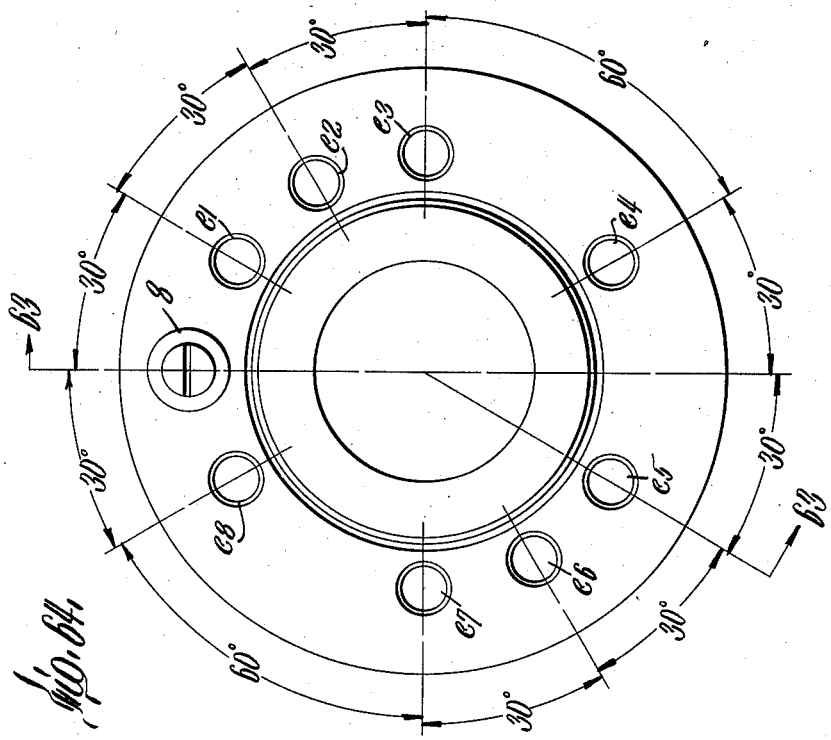
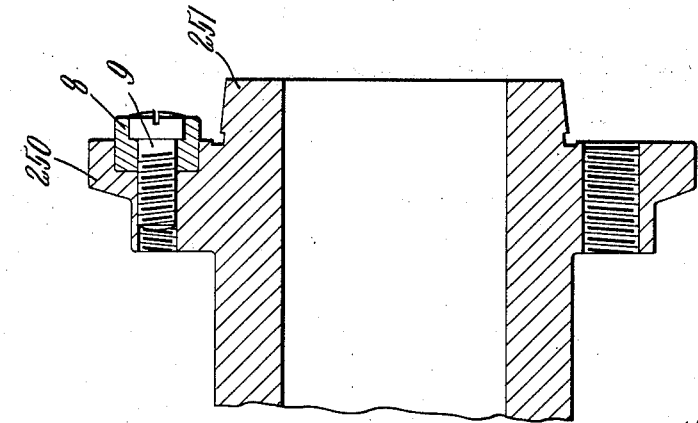

June 5, 1934.　　A. E. DRISSNER ET AL　　1,961,605
STANDARD SPINDLE NOSE
Filed March 26, 1931　　25 Sheets-Sheet 23
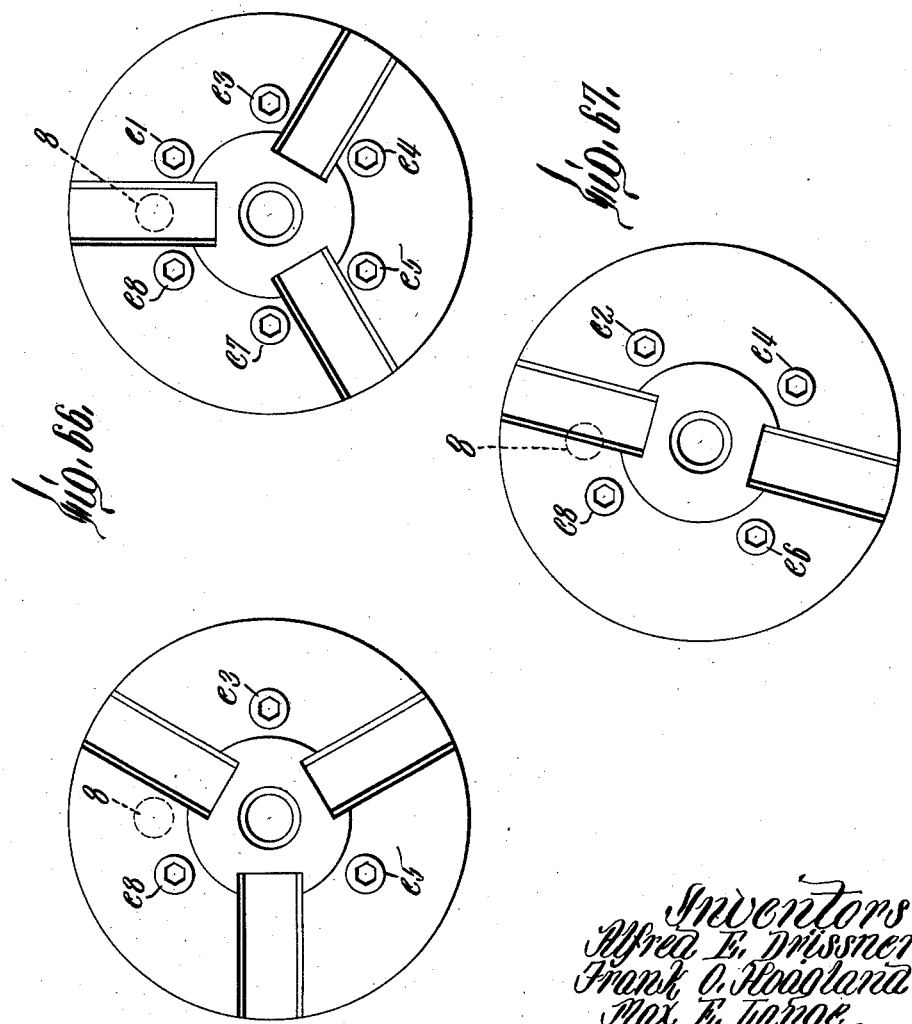

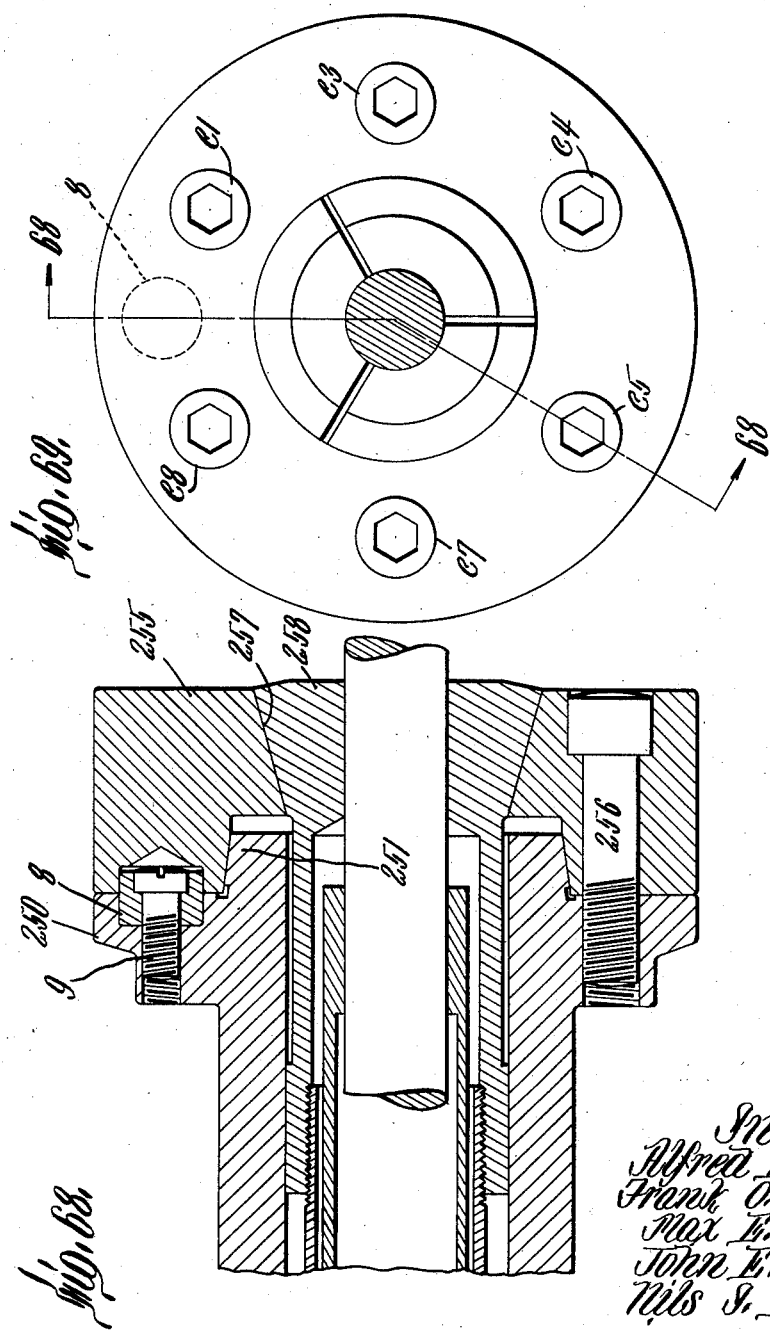

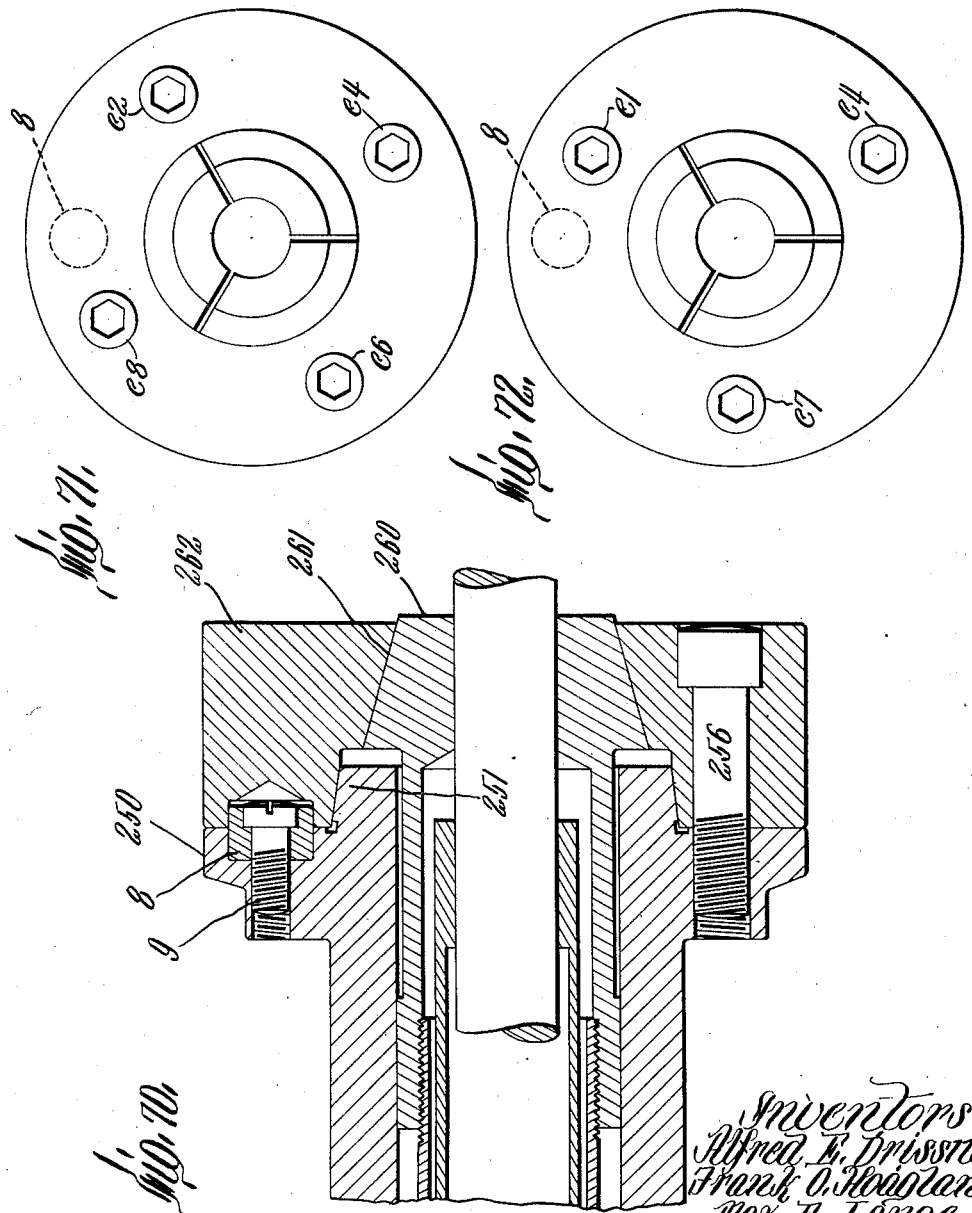

Patented June 5, 1934

1,961,605

UNITED STATES PATENT OFFICE

1,961,605

STANDARD SPINDLE NOSE

Alfred E. Drissner, Cleveland, Ohio, Frank O. Hoagland, West Hartford, Conn., Max E. Lange, Cleveland Heights, Ohio, Nils Ivar Lundberg, Madison, Wis., and John E. Lovely, Springfield, Vt.; said Drissner assignor to The National Acme Company, Cleveland, Ohio, a corporation of Ohio, said Hoagland assignor to Pratt & Whitney Company, Hartford, Conn., a corporation of New Jersey, said Lange assignor to The Warner & Swasey Company, Cleveland, Ohio, a corporation of Ohio, said Lundberg assignor to Gisholt Machine Company, Madison, Wis., a corporation of Wisconsin, said Lovely assignor to Jones & Lamson Machine Company, Springfield, Vt., a corporation of Vermont Application March 26, 1931, Serial No. 525,358

25 Claims. (Cl. 82—30)

This invention relates to machines such as lathes, screw machines, or the like, wherein one or more rotary spindles are each provided with a fixture by which the rotation of the spindle is imparted to the work. Such fixtures, for example, may comprise face plates, chucks, or collet hoods, and where chucks are used they may be provided with work-engaging jaws of different numbers both odd and even, such as two, three or four.

One of the objects of this invention is to produce a spindle nose of a standard design for given ranges of spindle size which will be well adapted to receive and have secured thereto any selected of a considerable variety of such work-driving fixtures in accordance with the particular requirements of any particular machine or operation. To this end the spindle nose is provided with faces designed to center and locate the fixtures, and is formed to receive any of a variety of fastening means as may be desired or required for securing any selected fixture. Certain of these fixtures may be secured by bolts, the nose being provided with holes so positioned that certain of these holes may be used with each of these particular fixtures three or more bolts disposed symmetrically with relation to the work-engaging parts being employed. Clamping means for engaging portions of the nose and fixture may be used either in addition to bolts or where the use of bolts is impracticable. Aside from the more universal standard construction portions, the nose may, if desired, be provided with other portions of particular suitability for more limited ranges of utilities.

For a more complete understanding of this invention, reference may be had to the accompanying drawings in which Figure 1 is a detail section on line 1—1 of Figure 2 of the nose portion of a work spindle of a size suitable for a considerable range of work.

Figure 2 is an end elevation of the same.

Figure 3 is a detail section on line 3—3 of Figure 2.

Figure 4 is a section on line 4—4 of Figure 5.

Figure 5 is an end elevation of the same showing a three-jaw chuck attached to the nose shown in Figures 1 to 3 by six bolts in the inner bolt circle.

Figure 6 is a view similar to a portion of Figure 5 but showing the use of three bolts in the inner bolt circle.

Figure 7 is a section on line 7—7 of Figure 8.

Figure 8 is an end elevation showing a three-jaw air chuck secured to the spindle nose of Figures 1 to 3 by six bolts in the outer bolt circle.

Figure 9 is a section on line 9—9 of Figure 10.

Figure 10 is an end elevation showing a four-jaw combination chuck secured to the nose of Figures 1 to 3 by four bolts in the inner bolt circle.

Figure 11 is a section on line 11—11 of Figure 12.

Figure 12 is an end elevation showing a four-jaw independent chuck secured to the spindle nose by four bolts in the outer bolt circle.

Figure 13 is a detail section on line 13—13 of Figure 12.

Figure 14 is a section on line 14—14 of Figure 15.

Figure 15 is an end elevation showing a four-jaw independent chuck secured to the nose by eight bolts in the outer bolt circle.

Figure 16 is a section on line 16—16 of Figure 17.

Figure 17 is an elevation showing a two-jaw air chuck fixed to the nose by six bolts in the outer bolt circle.

Figure 18 is a view similar to Figure 17 but showing the chuck secured to the nose by four bolts in the outer bolt circle.

Figure 19 is an end elevation showing a two-jaw hand operated chuck fixed to the nose by four bolts in the inner bolt circle.

Figure 20 is a section on line 20—20 of Figure 21.

Figure 21 is an end elevation showing a face plate secured to the nose by three bolts in the outer bolt circle.

Figure 22 is a detail section on line 22—22 of Figure 21.

Figure 23 is a section on line 23—23 of Figure 24 showing a face plate fixed to the nose by a clamping ring.

Figure 24 is a section on line 24—24 of Figure 23, parts being broken away and in section.

Figure 25 is an end elevation of a modified form of clamping ring and to a smaller scale than Figures 23 and 24.

Figure 26 is a section on line 26—26 of Figure 27 showing a modified construction of spindle nose.

Figure 27 is an end elevation of the same.

Figures 28 to 31 inclusive are detail sections showing various methods of fixing a chuck to the nose of Figures 26 and 27.

Figure 32 is a section similar to Figure 4, but with a modified form of spindle nose.

Figure 33 is an end elevation of the spindle nose shown in Figure 32.

Figures 34, 35, 36 and 37 are central longitudinal sections showing a spindle nose provided with extended portions of various forms and showing driving fixtures suitable for use therewith.

Figure 38 is a section on line 38—38 of Figure 39 showing a spindle nose of a larger size and for larger and heavier work than that shown in Figures 1 to 3.

Figure 39 is an end elevation of the same.

Figure 40 is a detail section on line 40—40 of Figure 39.

Figure 42:
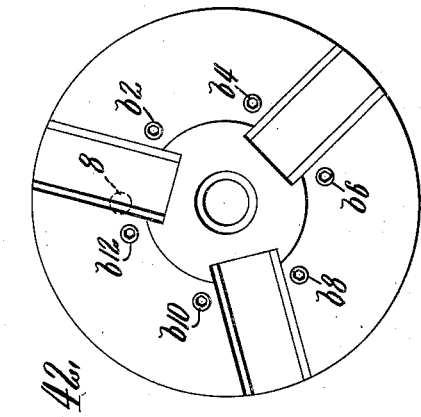
Figure 41:
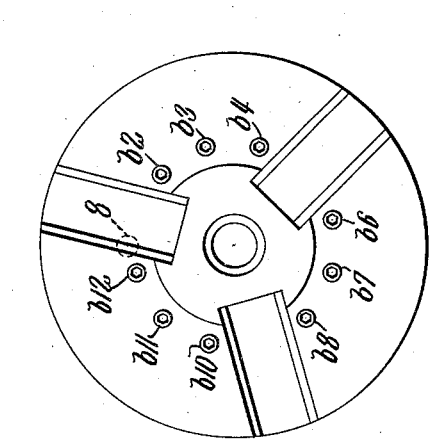

Figures 41 and 42 are diagrammatic elevations to a smaller scale showing three-jaw air chucks secured to the nose of Figures 38 and 39 by nine and six bolts, respectively, in the outer bolt circle.

Figure 44:
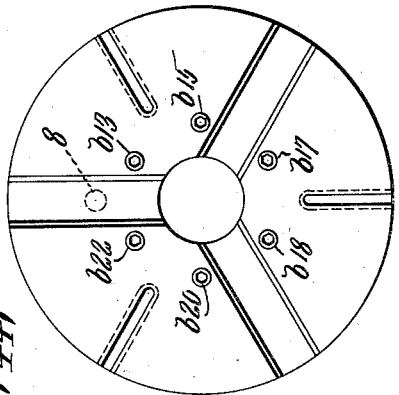
Figure 43:
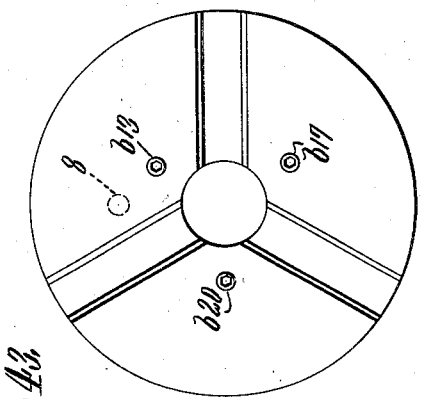

Figures 43 and 44 are similar views showing three-jaw scroll chucks secured by three and six bolts, respectively, in the inner bolt circle.

Figures 45 to 48 inclusive are similar views showing four-jaw chucks secured by four and eight bolts in the outer bolt circle and four and eight bolts in the inner bolt circle, respectively.

Figure 49 is a section on line 49—49 of Figure 50 and showing a modified form of large spindle nose having three bolt circles.

Figure 50 is an end elevation of the same.

Figure 51 is a detail section on line 51—51 of Figure 50.

Figure 52 is a section on line 52—52 of Figure 53 showing a nose of a smaller size and for lighter work than that of Figures 1 to 3.

Figure 53 is an end elevation of the same.

Figure 54 is a detail section on line 54—54 of Figure 53.

Figure 55 is a section to a smaller scale than Figures 52 to 54 inclusive, and taken on line 55—55 of Figure 56.

Figure 56 is an elevation showing a three-jaw chuck fixed to the nose of Figures 52 to 54 by three bolts in the outer bolt circle.

Figure 57 is a detail section on line 57—57 of Figure 56.

Figures 58 and 59 are diagrammatic elevations showing three-jaw chucks fixed to the smaller nose by three bolts in the inner bolt circle and six bolts in the outer bolt circle, respectively.

Figure 60 is a similar view showing a four-jaw independent chuck fixed to the nose by four bolts in the outer bolt circle.

Figure 61 is a section on line 61—61 of Figure 62.

Figure 62 is an elevation of the same showing a four-jaw combination chuck fixed to the nose of Figures 52 to 54 by four bolts in the inner bolt circle.

Figure 63 is a section on line 63—63 of Figure 64 showing a still smaller nose than is shown in Figures 52 to 54 inclusive.

Figure 64 is an end elevation of the same.

Figures 65 and 66 are diagrammatic elevations to a smaller scale showing three-jaw air chucks fixed to the nose of Figures 63 and 64 by three and six bolts, respectively.

Figure 67 is a similar view but showing a two-jaw air chuck fixed by four bolts.

Figure 68 is a section on line 68—68 of Figure 69 showing a nose of the size shown in Figures 63 and 64 but provided with a collet and hood.

Figure 69 is an end elevation of the same showing the collet hood secured to the nose by six bolts.

Figure 70 is a view similar to Figure 68 but showing a different construction of collet and hood.

Figures 71 and 72 are end elevations to a smaller scale than Figure 69 but showing the collet hood fixed to the nose shown in Figures 63 and 64 by four and three bolts, respectively.

Referring to the drawings, Figures 1, 2 and 3 show a spindle nose of a size suitable for use for a considerable range of work and in connection with single spindle automatic lathes, medium size turret lathes, and small and medium size engine lathes. The spindle, indicated at 1, is tubular and adjacent to its forward end is provided with an annular outwardly extending flange portion 2 from the forward face 3 of which extends an externally tapered pilot portion 4. The tapered outer face of this pilot acts as a centering surface for engagement with the work-driving fixture, while the forward face 3 of the flange portion 2 provides a locating face against which the fixture may be secured, as will more fully appear. The tapered face of the pilot is intended to contact with a mating face of the fixture before contact is made with the locating face 3 so that when the fixture is finally secured in position, a heavy press fit is secured with the pilot resulting in accurate and rigid centering of the fixture. The tapered formation of the pilot face also makes it possible to recondition the locating face and the pilot to their original accuracy whenever this may be found desirable as the result of wear or other cause. The rear face of the flange portion 2 adjacent to its periphery is formed tapering, being of gradually increased thickness inwardly from its periphery, having an annular rear face 6 inclined to the perpendicular to the axis of the spindle at an angle which should not exceed 30° and is preferably smaller than this; as shown being substantially 15°; for a purpose which will later appear.

The flange portion 2 is provided with a cylindrical socket 7 within which may be secured a cylindrical driving element or button 8, the outer end of which extends beyond the face 3 of the flange portion and is intended to engage in a mating socket in the work-driving fixture. As shown the button 8 is secured in position within the socket by means of a screw 9 having a head 10 seated in a counterbored portion 11 in the button, the screw extending through a central perforation 12 through the button and being threaded into a threaded hole 13 in the base of the socket 7. This button 8 thus acts as a key between the spindle and the work-driving fixture, but is preferable to keys of the usual rectangular form for several reasons. This socket in the nose and the mating socket in the fixture can be formed easily by merely drilling these parts and the button may be readily removed whenever desired. Its use does not require cutting into the pilot portion 4 and it does not encroach on space desirable for the elements by which the work-driving fixture may be attached in position.

Through the flange portion 2 is shown a series of threaded holes arranged in circular series and marked a1 to a10 inclusive. It will be noted that that the four holes a1, a5, a6 and a10 are positioned on radii displaced 30° from the diameter passing through the driving button 8. The holes a2, a4, a7 and a9 are located on radii positioned 60° from this diameter and the holes a3 and a8 are angularly displaced 90° from this diameter.

Within the pilot portion 4 is a circular series of threaded holes marked $a11$ to $a18$. Holes $a11$, $a12$, $a13$, $a16$, $a17$ and $a18$ are positioned on radii half way between radii on which the holes of the outer circle are arranged and the holes $a14$ and $a15$ are arranged 15° displaced from the diameter containing the driving button. Angularly adjacent holes are thus spaced from each other by multiples of 15°, for example, holes $a1$, $a11$, $a2$, $a12$ and $a3$ are spaced successively from each other by 15°, holes $a3$ and $a4$ are spaced from each other by 30° and holes $a1$ and $a10$ are spaced from each other by 60°. The greatest multiple is thus less than five. This arrangement of the holes in two series in what may be termed inner and outer bolt circles makes possible ready attachment to the nose of a very considerable number of work-driving fixtures of various well known types. For example, in Figures 4 and 5 a three-jaw chuck of the scroll type is illustrated. As there shown the jaws are indicated at 20 slidable in radial ways 21 in the chuck body and having on their rear faces teeth 22 which engage between spirally arranged ribs 23 on a scroll plate 24. This scroll plate is annular and is rotatable about the axis of the chuck to adjust the jaw simultaneously toward or from the axis of the chuck, as by means of a beveled pinion 25 rotated by means of a detachable handle 35 and having teeth 26 meshing gearing teeth 27 on the back face of the scroll plate. Within the scroll plate the body of the chuck is provided with a hub portion 28 and the back face of the chuck is closed off by a plate 29 which may be secured to the body by means of bolts 30 extending therethrough and into the hub 28. This hub portion is perforated for the reception of bolts such as 40 which may be engaged in suitable holes in the inner bolt circle of the spindle nose. For example, as shown in Figure 5, these bolts may engage in the nose bolt holes $a11$, $a12$, $a14$, $a15$, $a17$ and $a18$. Thus this form of chuck may be secured to the nose by six bolts in the inner bolt circle symmetrically arranged with relation to the jaws so that the stresses in service are evenly distributed between the nose and the chuck. The driving button 8 is seated in a socket 42 in the plate 29 of the chuck immediately back of one of the jaws 20. The jaws may, if desired, be provided with supplemental work-engaging jaws, one of which is indicated in dotted lines 45 in Figure 4, these being secured directly to the jaws 20 as by bolts indicated at 46 and 47.

Instead of securing a three-jaw chuck by six bolts symmetrically arranged with relation to the jaws, it may be secured by three bolts, if desired, this arrangement being shown in Figure 6. The three holes $a12$, $a15$ and $a18$ may then be employed, the driving button 8 being positioned somewhat to one side of one of the jaws 20.

In Figures 7 and 8 an air operated three-jaw chuck is shown secured to the nose of Figures 1 to 3. In this construction of chuck the jaws are secured to blocks or carriers 51 which are radially slidable in ways and are moved in and out simultaneously by the rocking of levers 52, there being one lever for each jaw carrier. Each lever 52 is fulcrumed as at 53 and has an arm 54 engaging a shoe 55 in a ring 56. This ring is axially slidable to rock the levers simultaneously and for this purpose it is shown as having secured thereto a hollow stem 57 to which is secured a rod 58 which extends back through the spindle to the fluid pressure-actuating cylinder. With this form of chuck the outer bolt circle of the nose may be used. For example, as shown in Figures 7 and 8, bolts as 60 may be passed through the body of the chuck and engaged in the holes $a1$, $a3$, $a5$, $a6$, $a8$ and $a10$ of the outer bolt circle. There are thus six bolts employed which are symmetrically arranged with relation to the jaws. The driving button 8 is positioned directly back of one of the jaws.

In Figures 9 and 10 is shown a combination chuck having four work-engaging jaws. This combination chuck is provided with a carrier 70 for each jaw, all the carriers being adjusted in and out simultaneously by rotation of the scroll plate 71. A work-engaging jaw 72 is adjustably secured to each carrier 70 as by means of a screw 73 having threaded engagement with the rear face of the jaw and fixed against axial movement with relation to the carrier as by means of a flange 75 thereon engaging in a slot 76 in the forward face of the carrier. Any screw 73 may be rotated by a suitable tool thus to adjust each jaw independently of the others, while rotation of the scroll plate will cause simultaneous in or out motions of all. If desired a supplemental jaw, shown in dotted lines at 78, may be secured to each jaw 72. With this form of chuck the bolts 79 used for securing it to the spindle nose may be engaged in holes of the inner bolt circle, such as $a11$, $a13$, $a16$ and $a18$, four bolts being employed symmetrically related to the four jaws. The driving button 8 is located immediately back of one of the jaws.

In Figures 11 and 12 is shown a four-jaw independent chuck. Each of the jaws, as 80, has threaded engagement with an actuating screw 81 held against longitudinal motion by a flange 82 thereon engaging in a slot 83 in a plate 84. This chuck may be secured by bolts such as 85 engaging holes in the outer bolt circle such as $a2$, $a5$, $a7$ and $a10$. The driving button 8 is then located somewhat to one side of the axis of one of the jaws.

In Figures 14 and 15 a four-jaw independent chuck is illustrated similar to that shown in Figures 11 and 12 but secured to the spindle nose by eight bolts, 85, which engage holes in the outer bolt circle as $a1$, $a2$, $a4$, $a5$, $a6$, $a7$, $a9$ and $a10$. With this arrangement the driving button 8 is located directly back of one of the jaws.

In Figures 16, 17 and 18 is shown a two-jaw air chuck constructed similarly to that shown in Figure 7, except that two jaws instead of three are employed. This chuck is shown in Figures 16 and 17 as secured to the nose by six bolts, such as 90, arranged to engage in holes $a1$, $a3$, $a5$, $a6$, $a8$ and $a10$ of the outer bolt circle. The driving button 8 is located directly back of one of the two jaws. In Figure 18 a similar type of chuck is shown as secured by four bolts in the outer bolt circle as $a2$, $a5$, $a7$ and $a10$. The driving button is then located somewhat to one side of the axis of one of the jaws.

In Figure 19 is shown diagrammatically a two-jaw hand-operated chuck, this being secured to the spindle nose by four bolts in the inner bolt circle as $a11$, $a13$, $a16$ and $a18$. The driving button 8 is at one side half way between the two jaws. It will be noted that all these arrangements of bolts are symmetrical with respect to the work-engaging jaws and that three or more bolts are used.

In Figures 20 and 21 is shown a method of attaching a face plate 95 to the spindle nose. This face plate is provided with a rear flanged extension 96 having a tapered socket portion 97 engaging with the pilot 4 of the spindle nose, this flange 96 being secured to the spindle nose by three bolts arranged in the outer bolt circle as at a1, a5, and a8. At 98 are shown blocks adjustable radially in radial slots 99 of the face plate and provided with work-engaging screws 100. The bolts which secure the face plate to the nose are arranged symmetrically with relation to the slots 99. The driving button engages in a socket in the flange 96 somewhat angularly displaced from the securing bolt engaging in the hole a1.

In Figures 23 and 24 is shown another method of attaching the face plate 105 in position. This face plate is shown as provided with a flange 106 at its rear end provided with a socket 107 to receive the spindle nose 4. The forward face of this flange 106 adjacent to its periphery is provided with an inclined face 108 oppositely disposed to the face 6 of the flange 2 of the nose. A clamping ring 110 is then engaged about the peripheries of these two flanges, this ring having a tapered groove 111, the sides 112 and 113 of which are formed complemental to the inclined faces 6 and 108. As shown in Figure 24 the clamp ring 110 may be made in two parts secured together as by means of the screws 115 by which the parts may be pulled tightly about the peripheries of the nose and face plate flanges thus to securely fix them together. By forming the inclined faces at angles not exceeding 30° to a plane perpendicular to the spindle axis, the clamping effort may be made sufficiently strong to insure non-slipping engagement between the parts with their locating faces in proper contact. Instead of forming the clamping ring in two parts secured together by screws they may, if desired, be hinged together at one end as shown in Figure 25, a link 120 being shown as pivoted at 121 to each of the ring sections, the other ends of the sections being secured together by a single screw 123 by the tightening of which the sections may be clamped about the nose and the face plate flange.

The clamping ring is preferably provided with inspection holes 124 at various points spaced angularly about its circumference, as shown in Figure 24, through which a feeler may be inserted to determine whether or not the flanges of the fixture and nose are in proper engagement.

Instead of securing the work-engaging fixtures to the nose by bolts engaging in threaded openings in the nose, in some cases it may be desired to secure the fixtures by other types of fastening elements. For example, as shown in Figures 26 and 27, the nose may be provided with a flange 130 back of the pilot 4 which may be provided with unthreaded holes such as 131 therethrough located with the proper angular spacing about the axis of the spindle. As shown in Figure 27 such holes are located at a1, a2, a3, a5, a6, a7, a8 and a10 corresponding in angular relation to the correspondingly numbered holes shown in Figure 1, the driving button 8 being positioned also in the corresponding relation. Of course pilot extensions such as are shown, for example, in Figures 34 to 37 inclusive might be used with the construction of Figures 26 and 27.

In Figure 28 the work-engaging fixture shown as a scroll chuck is provided with threaded holes 135 extending inwardly from its rear face within which are engaged studs 136. Each of these studs is preferably provided with a flat 137 by which it may be grasped for securing it to the fixture. These studs are spaced in accordance with the spacing of the holes 131 which it is desired to use in any particular instance and when the fixture is in place they extend through these holes 131, and nuts as at 138 are threaded on their rear ends. In Figure 29, in place of each stud a cap screw 140 may be employed which is inserted through the back face of the flange 130 through the desired hole 131 and screwed home in the threaded hole 135 of the fixture.

In Figure 30 the fixture is shown as provided with holes 145 extending entirely therethrough in position for the passage of through bolts 146 which extend through the desired holes 131 of the fixture and receive nuts 147 on their rear ends back of the flange 130.

Figure 31 shows a construction quite similar to Figure 30, except that the through bolt 150 is shown as provided with a threaded head 151 provided with a screw driver slot 152, this threaded head engaging in a threaded counterbored portion in the bolt hole.

In some cases it may be found desirable to provide a pair of spaced locating faces for the work-engaging fixture and the nose. Where this is desired the forward end of the pilot 4 may be provided with an annular rib 160 (see Figures 32 and 33), the forward face of which is located at an exact distance forwardly of the flange face 3. The rear face of the fixture will then be provided not only with its locating face for engagement with the face 3, but will also be provided with a face portion such as the end face of a rearwardly extending annular rib 162 accurately formed to engage the face 160 on the pilot 4. These portions 160 and 162 are preferably arranged inwardly from the periphery of the pilot portion in order to be spaced from the outer locating faces and likewise to be positioned inwardly of the bolts 40 which secure the chuck to the spindle nose. The end elevation of this nose, as shown in Figure 33, is the same as that of Figure 2, except for the provision of the locating rib 160.

In Figure 34 is shown a modification particularly intended for situations where quick detachability of the fixture is desired. The pilot portion 4 of the nose is provided with a forward extension 200 of substantially smaller diameter than the periphery of the pilot and this is shown as tapered and threaded to engage a mating threaded portion 201 of the fixture 202 which is shown as a face plate. As in this construction the fixture has threaded engagement with the spindle nose, a driving button is not employed, but in order to prevent unscrewing of the fixture, as when a brake is applied to stop the rotation of the spindle, a clamp ring such as 110 may be employed to secure the nose and fixture together in the manner shown, for example, in Figures 23 to 25.

In Figure 35 another construction is shown particularly intended to support a center well out toward the outer face of the fixture 205. According to this construction the nose is provided with a tubular extension 206 from the forward face of the pilot 4 within which is positioned the bushing 207 which carries the center 208. A driving button 8 may be employed with this construction and the clamp ring 110 may be employed to fix the fixture to the nose if desired or bolts such as shown in Figure 11 at 85 may be used.

In Figure 36 a construction particularly applicable to engine lathes is illustrated in which the spindle nose is provided with a tubular extension 210 forwardly of the pilot 4 having straight external threads for engagement with the collet hood 211. No driving button will be employed with this arrangement because of the threaded engagement between the hood 210 and the nose. The parts may be held together as by means of the clamping ring 110. The collet hood is provided with the tapered inner face 212 for cooperation with the tapered portion 213 of the spring collet 214 so that by axial motion of this collet the work shown at 215 may be gripped or released.

In Figure 37 the nose construction shown in Figure 35 with the extension 206 has been shown in connection with a scroll chuck, this chuck being fixed to the spindle nose by the clamp ring 110, a driving button 8 being employed to key the spindle and the chuck together. The clamp ring engages a circular fixture flange spaced back of the chuck head sufficiently for the clamping ring to engage its forward face.

Where the extension is threaded as is shown in Figure 36, the tops of the threads are preferably flat in order that this extension may be used with a face plate or chuck, as is shown in Figures 35 and 37 respectively, without danger of damaging the threads, the extension acting in any of these constructions as a pilot to prevent the fixture from dropping off before it is secured in position. Of course the noses shown in Figures 34 to 37 inclusive may be provided with holes for attaching bolts arranged as shown, for example, in Figures 2 or 27.

In Figures 38 to 40 is shown a spindle nose construction of a larger size suitable for large size engine lathes and turret lathes. This nose is provided with a circular flange 220 and a pilot 221 similar in configuration to the flange 2 and the pilot 4 shown in Figures 1, 2 and 3. The flange 220 is provided with a socket for the driving button 8 which is secured therein in the same manner as illustrated in Figure 1. The flange 220 and the pilot 221 are provided with threaded holes for the reception of fixture-securing bolts, these also being arranged in two circular series, the holes of the outer bolt circle being shown at $b1$ to $b12$ and the holes of the inner bolt circle being shown at $b13$ to $b22$. The angular arrangement of the holes of the inner bolt circle with reference to the diameter passing through the driving button 8 is the same as that of the holes of the outer bolt circle in the form shown in Figure 2. The holes of the outer bolt circle, however, are arranged for the most part on radii positioned half way between radii on which the holes of the inner bolt circle are positioned, in this respect corresponding in general to the arrangement of the holes of the inner bolt circle shown in Figure 2. However, there are more holes illustrated in this outer bolt circle than in the inner bolt circle of Figure 2, there being four holes $b1$, $b6$, $b7$ and $b12$ arranged on radii 15° angularly displaced from the diameter passing through the driving button 8, and there being a hole on each radius half way between those on which the holes $b13$ to $b17$ and $b18$ to $b22$ of the inner bolt circle are located. In this construction the maximum angular spacing of angularly adjacent holes is 30°, while the minimum spacing as in the construction shown in Figure 2 is 15°.

Figures 41 to 48 shown diagrammatically the arrangements of bolt holes used for the securing of various types of driving fixtures to the nose shown in Figures 38 to 40. Figures 41, 42, 43 and 44 show various arrangements of three-jaw chucks of various kinds, using bolts in the bolt holes therein indicated by number in each case, the bolts being arranged symmetrical with relation to the work-holding jaws and at least three bolts being used. The angular arrangement of the driving button with reference to the jaws is also indicated in these figures. Figures 45 to 48 show various arrangements of four-jaw chucks in the same manner.

In some cases it may be desirable to provide an even larger number of bolt holes for receiving fastenings, particularly in the largest sizes. Thus in Figures 49, 50 and 51 is shown a construction wherein the bolt holes are arranged in three circular series. The outer circle is represented by the bolt holes marked $c1$ to $c12$, the intermediate bolt circle by holes marked $c13$ to $c22$, and the inner bolt circle by holes marked $c23$ to $c34$, the intermediate bolt circle comprising the holes $c13$ to $c22$, corresponding in angular spacing to the inner bolt circle shown in Figure 39 and to the outer bolt circle shown in Figure 2. The holes of the outer and inner circles of the three-circle form are positioned on radii half way between the radii on which the holes of the intermediate circle are positioned and at 15° from the diameter passing through the driving button 8. Here also the maximum angular spacing of the holes is 30° while the minimum spacing is 15°. These figures show also the locating pilot rib at 225 similar to the rib 160 shown on Figures 32 and 33.

In Figures 52 to 54 is shown a smaller sized nose than that of Figures 1 to 3, particularly suitable for the larger sizes of multiple spindle automatic screw machines, particularly when using collets and without the clamping ring, multiple spindle automatic chucking lathes, and the smaller sizes of turret and engine lathes. This spindle nose is provided with a circular flange 230 and a pilot 231. In the flange 230 is located a socket for the driving button 8 which is secured therein as heretofore described, and the flange and pilot are provided with outer and inner bolt circles, respectively. The four holes $d1$, $d4$, $d5$ and $d8$ of the outer bolt circle are each located on radii displaced 30° from the diameter passing through the driving button, the holes $d2$ and $d6$ on radii displaced 60° from this diameter, and the holes $d3$ and $d7$ are on radii displaced 90° therefrom. The inner bolt circle has holes $d9$ to $d14$, each displaced 15° from a radius on which is located one of the holes in the outer bolt circle. It will be noted that the maximum angular spacing of the holes is 60°, the minimum is 15° and that spacings of 30° and also of 45° occur, the latter spacing being at holes $d3$ to $d11$, $d4$ to $d12$ and $d7$ to $d14$. The total number of holes of each of the circles, however, is less than in the larger forms In Figures 55 to 57 a three-jaw chuck is shown as secured to the nose of Figures 52 to 54 by three bolts in the outer bolt circle as at $d3$, $d5$ and $d8$. The driving button 8 is located somewhat angularly displaced from one of the three jaws. These attaching bolts 240 are symmetrically disposed with relation to the jaws as is clearly shown in Figure 56.

In Figures 58 and 59 are shown other arrangements of bolts for securing three-jaw chucks, Figure 58 showing a three-jaw scroll chuck secured by three bolts at $d10$, $d12$ and $d14$ in the inner bolt circle while Figure 59 shows a three-jaw air chuck secured by six bolts at $d1$, $d3$, $d4$, $d5$, $d7$ and $d8$ in the outer bolt circle.

Figure 60 shows diagrammatically a four-jaw independent chuck secured to the nose shown in Figures 52 to 54 by four bolts at $d2$, $d4$, $d6$ and $d8$ in the outer bolt circle.

Figures 61 and 62 show a combination four-jaw chuck which is secured to the same spindle nose by means of the bolts 240 which are located in the four holes $d9$, $d11$, $d13$ and $d14$ of the inner bolt circle.

In Figures 63 and 64 is shown a still smaller size of nose having bolt holes in a single bolt circle only. This type of nose is suitable for multiple spindle automatic screw machines and chucking machines, particularly for two and three-jaw air chucks. This nose is provided with the circular flange 250 and the pilot 251, the button 8 being secured in the flange 250 as previously described. The bolt circle is arranged in the flange 250 and comprises the bolt holes $e1$ to $e8$ which are positioned angularly identically with the outer bolt circle of the larger size shown in Figure 53 adjacent bolt holes being spaced by either 30° or 60°.

In Figures 65 and 66 are illustrated diagrammatically three-jaw air chucks which are secured to the nose shown in Figures 63 to 64 by three and six bolts, respectively, located symmetrically with relation to the three jaws. In Figure 67 a two-jaw air chuck is shown secured to the same small size nose by four bolts threaded into the holes $e2$, $e4$, $e6$, $e8$.

In Figures 68 and 69 this small size nose is shown to which is attached the collet hood 225 by six bolts 256 at $e1$, $e3$, $e4$, $e5$, $e7$, and $e8$. This hood is shown as provided with a tapered face 257 for engagement with a mating face on the spring collet 258.

In Figure 70 an arrangement similar to Figure 68 is shown but with the direction of taper of the engaging faces 261 between the collet 260 and the hood 262 reversed so that gripping of the stock is produced by an outward movement of the collet in Figure 70 instead of by an inward movement thereof as in the form shown in Figure 68.

In Figure 71 the collet hood is shown as secured to the spindle nose by four bolts located at $e2$, $e4$, $e6$ and $e8$, while in Figure 72 the collet hood is shown as secured to the nose by three bolts in bolt holes $e1$, $e4$ and $e7$.

From the foregoing description of certain embodiments of this invention it should be evident to those skilled in the art that various other changes and modifications might be made without departing from the spirit or scope of this invention as defined by the appended claims.

We claim:

1. A spindle nose having a face against which a work-driving fixture may be secured, said nose having holes arranged in a plurality of circular series, said holes being spaced to receive selectively securing bolts for fixtures of different types and having different numbers of work-engaging jaws, said bolts extending from said fixture between said jaws and symmetrically relative thereto.

2. A spindle nose having a face against which a work-driving fixture may be secured, said nose having holes arranged in a plurality of circular series, said holes being spaced to receive selectively securing bolts for fixtures of different types and having either two or three work-engaging jaws, said bolts extending from said fixture between said jaws and symmetrically related thereto.

3. A spindle nose having a face against which a work-driving fixture may be secured, said nose having holes arranged in a plurality of circular series, said holes being spaced to receive selectively securing bolts for fixtures of different types and having either three or four work-engaging jaws, said bolts extending from said fixture between said jaws and symmetrically relative thereto.

4. A spindle nose having a face against which a work-driving fixture may be secured, said nose having holes arranged in a plurality of circular series, said holes being spaced to receive selectively securing bolts for fixtures of different types and having either two, three or four work-engaging jaws, said bolts extending from said fixture between said jaws and symmetrically related thereto.

5. A spindle nose having a face against which a work-driving fixture may be secured and a central pilot portion extending beyond said face, said nose having holes arranged in a plurality of circular series, the holes of one of said series being positioned in said portion, said holes being spaced to receive selectively securing bolts for fixtures of different types and having different numbers of work-engaging jaws.

6. In combination, a spindle having a circular flange portion, and a tapered fixture-engaging pilot extending concentrically from one face of said flange portion, said spindle having a plurality of holes arranged in a plurality of concentric circular series for receiving fixture-securing elements, the holes of one of said series being positioned in said flange and the holes of another of said series being positioned in said pilot, said flange having a cylindrical socket between certain of said holes, and a cylindrical driving button fixed in said socket and extending outwardly thereof for engagement in a mating socket of the fixture.

7. In combination, a spindle nose having an end face for contact with a work-driving fixture, said nose having a cylindrical socket in said face, a cylindrical driving button secured in said socket and projecting outwardly of said face, said nose having holes arranged in circular series for the reception of fixture-attaching elements, four of said holes being arranged on radial lines displaced 30° from a diameter passing centrally through said button.

8. In combination, a spindle nose having an end face for contact with a work-driving fixture, said nose having a cylindrical socket in said face, a cylindrical driving button secured in said socket and projecting outwardly of said face, said nose having holes arranged in circular series for the reception of fixture-attaching elements, four of said holes being arranged on radial lines displaced 30° from a diameter passing centrally through said button and certain of the other of said holes being arranged on radial lines displaced 60° and 90° from said diameter.

9. In combination, a spindle nose having an end face having a portion for contact with a work-driving fixture, said nose having holes arranged in circular series concentric with the axis of said nose, four of said holes being arranged on radii 30° displaced from one diameter, and others of said holes being arranged on radii displaced 60° and 90°, respectively, from said diameter.

10. In combination, a spindle nose having an end face having a portion for contact with a work-driving fixture, said nose having holes arranged in circular series concentric with the axis of said nose, four of said holes being arranged on radii 30° displaced from one diameter, others of said holes being arranged on radii displaced 60° and 90°, respectively, from said diameter, and a fixture-driving element on said diameter.

11. In combination, a spindle nose having an end face presenting an area for contact with a work-driving fixture, said nose having holes arranged in a plurality of concentric circular series concentric with the axis of said nose, certain of the holes of one series being arranged on radii displaced 30° from one diameter, others of the holes of said one series being arranged on radii displaced 60° and 90°, respectively, from said diameter, and certain of the holes of another of said series being arranged on radii midway between certain of the radii on which the holes of said one series are arranged.

12. In combination, a spindle nose having an end face presenting an area for contact with a work-driving fixture, said nose having holes arranged in a plurality of concentric circular series concentric with the axis of said nose, certain of the holes of one series being arranged on radii displaced 30° from one diameter, others of the holes of said one series being arranged on radii displaced 60° and 90°, respectively, from said diameter, certain of the holes of another of said series being arranged on radii midway between certain of the radii on which the holes of said one series are arranged, and others of the holes of said other series being arranged on radii angularly displaced 15° from said diameter.

13. In combination, a spindle nose having an end face presenting an area for contact with a work-driving fixture, said nose having holes arranged in a plurality of concentric circular series concentric with the axis of said nose, certain of the holes of one series being arranged on radii displaced 30° from one diameter, others of the holes of said one series being arranged on radii displaced 60° and 90°, respectively, from said diameter, certain of the holes of another of said series being arranged on radii midway between certain of the radii on which the holes of said one series are arranged, and a fixture-driving element on said nose at said diameter.

14. In combination, a spindle nose having an end face presenting an area for contact with a work-driving fixture, said nose having holes arranged in a plurality of concentric circular series concentric with the axis of said nose, certain of the holes of one series being arranged on radii displaced 30° from one diameter, others of the holes of said one series being arranged on radii displaced 60° and 90°, respectively, from said diameter, certain of the holes of another of said series being arranged on radii midway between certain of the radii on which the holes of said one series are arranged, and others of the holes of said other series being arranged on radii angularly displaced 15° from said diameter, and a fixture-driving element on said nose at said diameter.

15. In combination, a spindle nose having an end face presenting an area for contact with a work-driving fixture, said nose having holes arranged in three concentric circular series concentric with the axis of said nose, certain of the holes of one series being arranged on radii displaced 30° from one diameter, other holes of said one series being arranged on radii displaced 60° and 90°, respectively, from said diameter, and certain of the holes of each of the two other series being arranged on radii midway between radii on which are positioned holes of said one series.

16. In combination, a spindle nose having an end face presenting an area for contact with a work-driving fixture, said nose having holes arranged in three concentric circular series concentric with the axis of said nose, certain of the holes of one series being arranged on radii displaced 30° from one diameter, other holes of said one series being arranged on radii displaced 60° and 90°, respectively, from said diameter, certain of the holes of each of the two other series being arranged on radii midway between radii on which are positioned holes of said one series, and a fixture-driving element carried by said nose on said diameter.

17. In combination, a spindle nose having a cylindrical socket extending inwardly from an end face, and a threaded hole in the base of said socket, a cylindrical driving button seated in said socket and extended beyond said face, and a screw extending from the inner end of said button in threaded engagement with said hole.

18. In combination, a spindle nose having a cylindrical socket extending inwardly from an end face, and a threaded hole in the base of said socket, a cylindrical driving button seated in said socket and extended beyond said face, said button having a counterbored hole therethrough, and a screw passed through said counterbored hole and engaging in said nose hole and having a head seated in said counterbore.

19. In combination, a spindle having a circular flange, a work fixture having a circular flange engageable in face to face relation with said spindle flange, and a clamping ring engaging said flanges for securing them together, said ring having holes therethrough through which a feeler may be extended to determine the closeness of engagement of said flanges.

20. In combination, a spindle having a circular flange portion and a pilot extending centrally from said portion, said pilot having a tapered fixture-engaging face, an extension concentric with said pilot and of substantially smaller diameter, a work-engaging fixture having a flange engageable in face to face relation with said spindle flange and surrounding said extension and having a face engageable with said pilot, and a clamp ring extending about the peripheries of said flanges for securing said flanges together.

21. A spindle nose having a face to receive a face of a work driving fixture, said nose having a plurality of holes arranged angularly about its axis to receive elements for securing said fixture to said nose with said faces in contact, certain angularly adjacent holes being angularly spaced by 15° and certain angularly adjacent holes being spaced by 30°.

22. A spindle nose having a face to receive a face of a work driving fixture, said nose having a plurality of holes arranged angularly about its axis to receive elements for securing said fixture to said nose with said faces in contact, certain angularly adjacent holes being angularly spaced by 15° and certain angularly adjacent holes being spaced by 60°.

23. A spindle nose having a face to receive a face of a work driving fixture, said nose having a plurality of holes arranged angularly about its axis to receive elements for securing said fixture to said nose with said faces in contact, certain angularly adjacent holes being angularly spaced by 30° and certain angularly adjacent holes being spaced by 60°.

24. A spindle nose having a face to receive a face of a work driving fixture, said nose having a plurality of holes arranged angularly about its axis to receive elements for securing said fixture to said nose with said faces in contact, certain angularly adjacent holes being angularly spaced by 15°, certain angularly adjacent holes being angularly spaced by 30° and certain angularly adjacent holes being angularly spaced by 60°.

25. A spindle nose having a face to receive a face of a work driving fixture, said nose having a plurality of holes arranged angularly about its axis to receive elements for securing said fixture to said nose with said faces in contact, certain angularly adjacent holes being angularly spaced by 15°, certain angularly adjacent holes being angularly spaced by 30°, certain angularly adjacent holes being angularly spaced by 45°, and certain angularly adjacent holes being angularly spaced by 60°.

ALFRED E. DRISSNER.
FRANK O. HOAGLAND.
MAX E. LANGE.
NILS IVAR LUNDBERG.
JOHN E. LOVELY.